(12) United States Patent
Kannan et al.

(10) Patent No.: US 10,233,133 B2
(45) Date of Patent: Mar. 19, 2019

(54) COATED GRANULAR FERTILIZERS, METHODS OF MANUFACTURE THEREOF, AND USES

(71) Applicant: SABIC GLOBAL TECHNOLOGIES B.V., Bergen op Zoom (NL)

(72) Inventors: Ganesh Kannan, Mt. Vernon, IN (US); Labeeb Chaudhary Ahmed, Riyadh (SA); Belinda Duckworth, Mt. Vernon, IN (US); Philip Wesley Bell, Mt. Vernon, IN (US); Shankar Kollengodu Subramanian, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 100 days.

(21) Appl. No.: 15/305,806

(22) PCT Filed: Apr. 27, 2015

(86) PCT No.: PCT/IB2015/053056
§ 371 (c)(1),
(2) Date: Oct. 21, 2016

(87) PCT Pub. No.: WO2015/170217
PCT Pub. Date: Nov. 12, 2015

(65) Prior Publication Data
US 2017/0088480 A1    Mar. 30, 2017

Related U.S. Application Data

(60) Provisional application No. 61/988,459, filed on May 5, 2014.

(51) Int. Cl.
*C05G 3/00* (2006.01)
*B01J 2/30* (2006.01)

(52) U.S. Cl.
CPC .............. *C05G 3/0029* (2013.01); *B01J 2/30* (2013.01); *C05G 3/0035* (2013.01); *C05G 3/0088* (2013.01)

(58) Field of Classification Search
CPC .. C05G 3/0029; C05G 3/0088; C05G 3/0035; B01J 2/30
See application file for complete search history.

(56) References Cited

U.S. PATENT DOCUMENTS 5,645,624 A       7/1997  Naka et al.
2011/0275520 A1*  11/2011 Frey ....................... A01N 25/10
                                                             504/360
(Continued)

FOREIGN PATENT DOCUMENTS

CN    101723752 A  *  6/2010
JP    H11263689 A     9/1999
(Continued)

OTHER PUBLICATIONS

Jarosiewicz, Anna, and Maria Tomaszewska. "Controlled-release NPK fertilizer encapsulated by polymeric membranes." Journal of Agricultural and Food Chemistry 51.2 (2003): 413-417.*
(Continued)

*Primary Examiner* — Jennifer A Smith
(74) *Attorney, Agent, or Firm* — Norton Rose Fulbright US LLP

(57) ABSTRACT

A coated fertilizer comprises a fertilizer granule; and a coating disposed on a surface of the fertilizer granule, wherein the coating comprises a poly(lactic acid); a second polymer comprising a poly(butylene succinate), a cellulose triacetate, or a combination comprising at least one of the foregoing; and a sealant. Methods of making the coated fertilizer are also disclosed.

20 Claims, 10 Drawing Sheets

(56) References Cited

U.S. PATENT DOCUMENTS

2012/0090366 A1* 4/2012 Pursell ................ C05G 3/0029
71/28
2016/0076062 A1* 3/2016 Medoff .................... C12P 7/46
562/589

FOREIGN PATENT DOCUMENTS

JP      2001294792 A    10/2001
KR       100974639 B1    8/2010

OTHER PUBLICATIONS

International Search Report and Written Opinion dated Sep. 23, 2015 for Application No. PCT/IB2015/053056, which was filed on Apr. 27, 2015 and published as WO2015170217 on Nov. 12, 2015 (Inventor—Kannan et al; Applicant—Sabic Global Technologies B.V.) (14 Pages).

* cited by examiner

COATED GRANULAR FERTILIZERS, METHODS OF MANUFACTURE THEREOF, AND USES

CROSS-REFERENCE TO RELATED APPLICATIONS

This is a U.S. National Phase Application of International Application No. PCT/IB2015/053056, filed Apr. 27, 2015, which claims the benefit of U.S. Provisional Application No. 61/988,459, filed on May 5, 2014, which are both incorporated herein by reference in their entirety.

BACKGROUND

This disclosure is directed to coated granular fertilizers, their methods of manufacture, and methods of use.

Granular fertilizers can be coated to reduce dust production and to slow the release of nutrients into the soil. However, commercial products such as sulfur-coated urea, polyurethane-coated urea, and polyethylene coated-urea have certain drawbacks. For example, sulfur coatings can increase the acidity of soil by forming sulfuric acid upon degradation of the coating. Because the sulfur coatings and the polyethylene coatings generally do not contain nitrogen, the overall nitrogen content of the fertilizer on a weight basis is decreased. The polyurethane and the polyethylene coatings are not readily biodegradable, and thus only partially decompose or do not decompose at all. These coating materials or the residues thereof can therefore accumulate in soil over time, with potentially adverse results. Accordingly, improved fertilizer coatings are continuously sought, in particular fertilizer coatings that are biodegradable. It would be a further advantage if the fertilizer coatings did not adversely affect soil conditions over time, and it would be an even further advantage if a high weight basis of nitrogen was maintained.

SUMMARY

In a first embodiment, a coated fertilizer comprises a fertilizer granule; and a coating disposed on a surface of the fertilizer granule, wherein the coating comprises a poly(lactic acid); a second polymer comprising a poly(butylene succinate), a cellulose triacetate, or a combination comprising at least one of the foregoing; and a sealant.

A method of manufacture of the coated fertilizer of the first embodiment comprises combining the poly(lactic acid), the second polymer, and the sealant to provide a coating composition; and depositing the coating composition as a layer on a plurality of fertilizer granules to provide the coated fertilizer.

Alternatively, a method of manufacture of the coated fertilizer of the first embodiment comprises dissolving the poly(lactic acid) and the second polymer in a solvent to provide a solution; depositing the solution on a fertilizer granule to form a first layer; and depositing a sealant on the first layer to form a second layer.

In a second embodiment, a coated fertilizer comprises: a fertilizer granule; and a coating disposed on the fertilizer granule, wherein the coating comprises lignin, starch acetate, or a combination thereof; and a second polymer comprising a poly(lactic acid), a poly(butylene succinate), a cellulose triacetate, a poly(caprolactone), a poly(butylene terephthalate adipate), a cellulose acetate, or a combination comprising at least one of the foregoing. For example, the coating comprises: a first layer disposed on the fertilizer granule, wherein the first layer comprises the lignin, starch acetate, or combination thereof; a second layer disposed on the first layer, wherein the second layer comprises one or more second polymers; and optionally, a third layer, wherein the third layer comprises an additional second polymer. Optionally the coating further comprises a sealant.

A method of making the coated fertilizer of the second embodiment comprises dissolving the lignin, starch acetate, or combination thereof in a first solvent to provide a first solution; depositing the first solution on a plurality of fertilizer granules to form a first layer; dissolving the one or more second polymers in a second solvent to provide a polymer solution; and depositing the polymer solution on the first layer-coated fertilizer granules to provide a second layer, optionally dissolving an additional second polymer in a third solvent to provide an additional polymer solution; and depositing the additional polymer solution on the second layer-coated fertilizer granules to provide a third layer.

Alternatively, a method of manufacture of the coated fertilizer of the second embodiment comprises dissolving the lignin, starch acetate, or combination thereof in a first solvent to provide a first solution; depositing the lignin solution on a plurality of fertilizer granules to form a first layer; dissolving at least two second polymers in a solvent to provide a second solution; and depositing the second solution on the first layer-coated fertilizer granules to provide the coated fertilizer.

A method of manufacture of the coated fertilizer of the second embodiment also comprises contacting the lignin, starch acetate, or a combination thereof, and cellulose triacetate, poly(caprolactone), or a combination thereof in a solvent to provide a coating composition; depositing the coating composition on a plurality of fertilizer granules to provide the coated fertilizer.

The above described and other features are further set forth in the following figures, detailed description, and claims.

BRIEF DESCRIPTION OF THE FIGURES

The following figures are exemplary, and do not limit the claims.

DETAILED DESCRIPTION

Figure 1:
FIG. 1 is a microscopic image of urea granules coated with 2 wt. % of lignin, 2 wt. % of cellulose acetate, and 0.5 wt. % of wax manufactured by drip coating.

The inventors hereof have developed fertilizer coatings comprising various combinations of one or more of poly (lactic acid), poly(butylene succinate), cellulose triacetate, lignin, and wax. The fertilizer coatings are biodegradable, and leave no toxic residues in the soil. Fertilizers coated with such coatings further have sustainable nutrient release rates, matching or approaching nutrient uptake rate of most plant, thus improving the yields. Further, the granule coating methods described herein allow the manufacture of coated fertilizers having an even and thin coating, which allows coated fertilizers to contain high nitrogen contents.

The coatings are compatible with a wide variety of fertilizer granules. The fertilizer granules can comprise nitrogen, phosphorus, or potassium sources such as ammonium nitrate, ammonium sulfate, ammonium sulfate nitrate, calcium nitrate, calcium ammonium nitrate, urea, urea-formaldehyde, monoammonium phosphate ("MAP"), diammonium phosphate, polyphosphate compounds, phosphate rock, single superphosphate ("SSP"), triple super phosphate, potassium nitrate, potassium chloride, or potassium sulfate ("SOP" or potash). Combinations comprising the foregoing may also be used. In an embodiment, the fertilizer granules comprise urea. The amounts of nitrogen, phosphorus, or potassium sources included in the final fertilizer granules depends on the intended end use, and can be 0 to 60 wt. % for each component, based on the total weight of the fertilizer granule.

Additionally magnesium sulfate and a source of one or more trace elements, i.e., micronutrients can be included, for example boron, calcium, chlorine, cobalt, copper, iron, manganese, molybdenum, nickel, sodium, zinc, or a combination comprising at least one of the foregoing can be present. These nutrients may be supplied in elemental form or in the form of salts, for examples as sulfates, nitrates, or halides. The amount of plant micronutrients depends on the intended end use and can be, for example, 0.1 to 5 wt. %, based on the total weight of the fertilizer granule.

Fillers can further be present in the granule, for example bentonite, calcite, calcium oxide, calcium sulfate (anhydrous or hemihydrate), dolomite, talc, sand, or a combination comprising at least one of the foregoing fillers.

Other components of granular fertilizers can include, for example, surfactants (if a liquid is present as described below), nucleation agents, or recycled fertilizer particles, which can act as a source of agents, nucleating soil conditioners such as calcium carbonate, activated carbon, elemental sulfur, biocides such as pesticides, herbicides, or fungicides, wicking agents, wetting agents, heat stabilizers, adhesives such as cellulose, polyvinyl alcohols, fats, oils, gum arabics, vinylidene ultraviolet stabilizers, antioxidants, reducing agents, colorants, binders (i.e., organochlorides, zeins, gelatins, chitosan, polyethylene oxide polymers, and acrylamide polymers and copolymers), and the like.

The fertilizer granules can have any shape or size suitable for their intended use. In an embodiment the fertilizer granules are substantially spherical. The fertilizer granules have an average particle diameter of 1.0 to 4.0 millimeters (mm). Within this range the average particle diameter can be greater than or equal to 1.5, or greater than or equal to 2.0 mm. Also within this range the average particle diameter can be less than or equal to 3.5, or less than or equal to 3.0 mm. In an embodiment at least 90% by weight of the fertilizer granules have a particle diameter of 2.0 to 4.0 mm. Particle diameter is determined according to "Size Analysis—Sieve Method" IFDC S-107 issued by International Fertilizer Development Center (IFDC) which is the most common and internationally approved method used to determine fertilizer particle size.

In an embodiment, the coating on the fertilizer granule comprises at least three components: a poly(lactic acid), a second polymer, which is poly(butylene succinate), cellulose triacetate, or a combination thereof, and a sealant. For example, the coating comprises poly(lactic acid), poly(butylene succinate), and a sealant. Alternatively, the coating comprises poly(lactic acid), cellulose triacetate, and a sealant. In these embodiments, no lignin is present in the coatings.

The poly(lactic acid) can have a weight average molecular weight ($M_w$) of 50,000 to 250,000 g/mol. As used herein, PLA (high) can refer to poly(lactic acid) having an $M_w$ of 150000 to 210000 g/mol, specifically 175000 to 190000 g/mol. PLA (low) refers to poly(lactic acid) having an $M_w$ of 30000 to 70000 g/mol, specifically 40000 to 65000 g/mol.

The recycled poly(lactic acid) can have a weight average molecular weight ($M_w$) of 30,000 to 250,000 g/mol, more specifically 100,000 to 200 000 g/mol.

The poly(butylene adipate-co-terephthalate) (Ecoflex) can have a weight average molecular weight ($M_w$) of 30,000 to 120,000 g/mol, more specifically 50,000 to 100 000 g/mol.

The cellulose acetate can have a weight average molecular weight ($M_w$) of 25,000 to 120,000 g/mol, more specifically 35000 to 70000 g/mol The poly(butylene succinate) can have an $M_w$ of 70,000 to 160,000 g/mol. As used herein, PBS (high) can refer to poly(butylene succinate) having an $M_w$ of 100,000 to 150000 g/mol, specifically 120000 to 140000 g/mol. PBS (medium) refers to poly(butylene succinate) having an $M_w$ of 75000 to 125000 g/mol, specifically 90000 to 110000 g/mol.

The cellulose triacetate can have an $M_w$ of 100,000 to 350,000 g/mol, specifically 12,5000 to 300,000 g/mol, more specifically 200,000 to 275,000 g/mol. The weight ratio of the poly(lactic acid) to the second polymer can be 10:1 to 1:10, for example, 5:1 to 1:5, 3:1 to 1:3, or 2:1 to 1:2.

The sealant further protects the granules from abrasion and moisture during shipping and storage, and comprises a wax. Waxes are liquid at 110 to 200° F. (43 to 95° C.). Examples of waxes include natural petroleum waxes, including paraffin waxes (hard, crystalline, brittle waxes composed primarily of unbranched alkanes, typically having melting points from 118 to 158° F. (48 to 70° C.), and microcrystalline waxes (soft, amorphous, malleable waxes composed primarily of branched alkanes, typically having melting points from 129 to 203° F. (54 to 95° C.), and fully refined paraffin waxes). Synthetic waxes can also be used, including polyethylene waxes having, for example a degree of polymerization of 10 to 18 carbon atoms. Exemplary waxes that are commercially available include a petroleum wax, C30+ from Chevron Phillips Chemical (CP-Chem), 7089A, R-4408, and R-3053A available from International Group, Inc. The wax can be present in the coating in an amount effective to provide 0.1 to 3 wt. %, 0.2 to 2 wt. %, or 0.5 to 1.8 wt. % of wax, based on the total weight of the coated fertilizer.

The coating can accordingly comprise more than 0, e.g., 0.1 to 5.7 wt. % of poly(lactic acid), 0.1 to 5.7 wt. % of the second polymer, and 0.1 to 3 wt. % of the sealant. In another embodiment, the coating can comprise 0.5 to 4.8 wt. % of poly(lactic acid), 0.5 to 4.8 wt. % of the second polymer, and 0.2 to 2 wt. % of the sealant.

When coated on the fertilizer granules, the amount of the coating (including the poly(lactic acid), the second polymer, and a sealant) is less than or equal to 6 wt. %, for example, 0.1 to 6 wt. %, 0.5 to 5 wt. %, 2 to 5 wt. %, or 3 to 5 wt. %, based on the total weight of the coated fertilizer.

The components of the coating are present in more than one layer. For example, in an embodiment, the coated fertilizer comprises a first layer disposed on the fertilizer granule, wherein the first layer comprises the poly(lactic acid) and the second polymer; and a second layer disposed on the first layer, wherein the second layer comprises the sealant. In another embodiment, the coated fertilizer comprises three layers wherein the first layer is disposed on the fertilizer granule, the second layer is disposed on the first layer, and the third layer is disposed on the second layer. The first layer can comprise poly(lactic acid) or the second polymer. The second layer can also comprise poly(lactic acid) or the second polymer, provided that the material in the first layer is not the same as the material in the second layer. The third layer can comprise the sealant.

In another embodiment, the coating comprises a first polymer comprising lignin, starch acetate, or a combination thereof, and a second polymer, where the second polymer can be poly(lactic acid), poly(butylene succinate), cellulose triacetate, poly(caprolactone), poly(butylene terephthalate adipate), cellulose acetate, or a combination comprising at least one of the foregoing.

Lignin is a polymer of aromatic alcohols most commonly derived from wood. Lignin can be obtained by the Kraft process. Exemplary lignin includes Kraft lignin marketed under the name of Indulin* AT or Protobind* 1000.

Starch acetate is a starch that has been acetylated to a degree of substitution (DS) of 1 to 3 with an acetyl value of 20% to 70%. As used herein, "acetyl value" refers to the weight percent (wt %) of acetic acid per unit measure of starch acetate. For example, an acetyl value of approximately 62.5 is equivalent to a DS of 3.0.

The second polymer includes poly(lactic acid), poly(butylene succinate), and cellulose triacetate as described above, as well as poly(caprolactone), poly(butylene terephthalate adipate), and cellulose acetate. The foregoing polymers can have an Mw in the range of 8,000 to 500,000 g/mol.

The weight ratio of the lignin, starch acetate, or a combination thereof to the second polymer can be 1:10 to 10:1, 5:1 to 1:5, 3:1 to 1:3, or 2:1 to 1:2. Lignin, the starch acetate, or the combination thereof is present in an amount of 0.1 wt. % to 6 wt. %, 0.1 wt. % to 5 wt. %, 0.1 wt. % to 3.5 wt. %, 0.2 wt. % to 3 wt. %, or 0.5 to 3 wt. %, based on the total weight of the coated fertilizer.

Optionally, the coating comprising the lignin, the starch acetate, or a combination thereof and the second polymer further comprises a sealant as described above. The sealant can be present in an amount of 0 to 5 wt. %, 0 to 3 wt. %, 0.1 to 3 wt. %, 0.2 to 2 wt. %, 0.1 to 1 wt. %, or 0.5 to 1.8 wt. %, based on the total weight of the coated fertilizer.

The coating can accordingly comprise more than 0, e.g., 0.1 to 5 wt. % of lignin, starch acetate, or a combination thereof, 0.1 to 6 wt. % of the second polymer, and 0 to 5 wt. % of the sealant. In another embodiment, the coating can comprise 0.1 to 6 wt. % of lignin, starch acetate, or a combination thereof 0.1 to 5 wt. % of the second polymer, and 0 to 3 wt. % of the sealant. Preferably the coating comprises 0.2 to 3 wt. % of lignin or starch acetate, 0.2 to 3 wt. % of the second polymer, and 0 to 1 wt. % of the sealant.

When coated on the fertilizer granules, the amount of the coating (lignin, starch acetate, or a combination thereof, second polymer, and optional sealant) is 0.5 wt. % to 10 wt. %, 1 wt. % to 9 wt. %, 2 wt. % to 8 wt. %, 2 wt. % to 7 wt. %, 2 wt. % to 6 wt. %, or 2 wt. % to 5 wt. %, based on the total weight of the coated fertilizer.

The components of the coating can be present in more than one layer. For example, in an embodiment, the coated fertilizer comprises a first layer disposed on the fertilizer granule, wherein the first layer comprises the lignin, starch acetate, or a combination thereof; and a second layer disposed on the first layer, wherein the second layer comprises the second polymer. Optionally the sealant can be present in a third layer disposed on the second layer.

In any of the foregoing embodiments, the coatings can further comprise an adjuvant as known in the art, for example a colorant, an adhesion promoter, or a surfactant, provided that the adjuvant does not significantly adversely affect the desired properties of the coated fertilizer. For example, a surfactant can include a primary and secondary ($C_{16-30}$)alkylamine, a ($C_{16-30}$)fatty acid amide of a primary ($C_{16-30}$)alkylamine, or a ($C_{16-30}$)fatty acid ester of a ($C_{16-30}$)alkanol. Examples of the foregoing surfactants include cetyl amine, stearyl amine, arachidyl amine, behenyl amine, dicetyl amine, distearyl amine, diarachidyl amine, dibehenyl amine, di(hydrogenated tallow) amine, cetyl stearamide, stearyl stearamide, stearyl erucamide, erucyl erucamide, candililla wax, carnauba wax, and montan wax.

Further in any of the foregoing embodiments, the coating or individual layers are disposed directly on the granule or other layers, that is, no intervening layers are present other than those described. The coatings and layers can be continuous or discontinuous. To optimize the sustained release features of the coated fertilizer the coating covers 90 to 100% of the surface area of the fertilizer granule. For coatings having more than one layer, each layer covers 90 to 100% of the surface area of the fertilizer granule or the underlying layer.

The thickness of the coating is adjusted to provide the desired sustained release and protection properties. In an embodiment, the total thickness of the coating is 20 to 70 micrometers. Within this range the thickness may be greater than or equal to 25, or greater than or equal to 30 micrometers. Also within this range the thickness may be less than or equal to 65, or less than or equal to 60 micrometers.

The coated fertilizer can be manufactured by various methods. The fertilizer granules can be coated by spray coating (for example, top, bottom, or side spray coating), drum coating, pan coating, fluid bed coating, continuous pour coating, or any other method known to those of skill in the art. This coating can be done in a batch or in a continuous process. The granules can be coated with a single layer in a single coating application, or the granules can be coated with multiple layers of the same coating material, such as, 2, 3, 4, 5, or more layers. When coating the core, the coating composition, e.g., the sealant, can be heated to above its melting point temperature so that the coating material is in a liquid state when it is applied to the core. After application of the liquid coating material to the core, the coated core is allowed to cool so that the coating material solidifies forming a solid layer surrounding the core. This process may be repeated one or more times to produce multiple layers of the same or different coating materials surrounding the core. Alternatively, the coating material can be dissolved or suspended in a solvent, applied to the granules, and the solvent evaporated. This process may be repeated one or more times to produce multiple layers of the same or different coating materials surrounding the core.

In a specific embodiment, a method of manufacturing a coated fertilizer comprises dissolving poly(lactic acid) and a second polymer selected from poly(butylene succinate), cellulose triacetate, or a combination thereof in a solvent to provide a polymer solution; spraying the polymer solution onto a plurality of fertilizer granules to form a first layer; and coating a sealant on the first layer to provide a second layer deposited on the first layer. The sealant can be coated by, for example, melt coating techniques. The solvent used to dissolve the poly(lactic acid) and the second polymer can be dichloromethane. To facilitate the formation of the polymer solution, the polymers and the solvent can be mixed at an elevated temperature where the solids content of the solution can be 5 to 15% of the composition by weight.

When the coating comprises lignin, starch acetate, or combination thereof, to form a coated fertilizer, sequential coating or simultaneous coating methods can be used. An example of a sequential coating method comprises dissolving the lignin, starch acetate, or combination thereof in a first solvent to form a first solution; depositing, e.g., spraying the first solution onto a plurality of fertilizer granules to form a first, lignin or starch acetate layer; dissolving the second polymer in a second solvent to provide a polymer solution; and depositing, e.g., spraying the second polymer solution on the first, lignin or starch acetate layer to form a second polymer layer deposited on the first layer. Optionally, at least two different second polymers can be present in the second solution. In another embodiment, an additional second polymer (different from the second polymer(s) of the second layer) can be dissolved in a third solvent, and deposited, e.g., by spraying on the second layer to form a third layer deposited on the second layer. The second layer or the third layer, when present, can optionally be further coated with a sealant to provide a sealant layer deposited on the second or third layer.

The solvent used to dissolve lignin, starch acetate, or combination thereof can comprise acetone and water having a volume ratio of 70:30 to 90:10, for example, 80:20 to 90:10. When the second polymer comprises cellulose triacetate, poly(caprolactone), or a combination thereof, the solvent used to dissolve the polymer can comprise acetone or a combination of acetone and water having a volume ratio of 70:30 to 90:10. When the second polymer comprises poly(lactic acid), poly(butylene succinate), poly (butylene terephthalate adipate), cellulose acetate, or a combination thereof, the solvent used to dissolve the polymer can comprise dichloromethane. To facilitate the formation of the lignin/starch acetate first solution or the polymer solution, the polymers and the solvent can be mixed at an elevated temperature. The solids content of the lignin/starch acetate solution and the polymer solution can be 5 to 15% of the composition by weight.

A simultaneous coating method comprises dissolving the lignin, starch acetate, or combination thereof and the second polymer in a solvent to provide a coating composition. The second polymer is accordingly selected to be soluble in the same solvent as the lignin, starch acetate, or combination thereof, for example, cellulose triacetate, poly(caprolactone), or a combination thereof. The coating composition is deposited, e.g., by spraying the coating composition onto a plurality of the fertilizer granules to provide a first layer. The method optionally further comprises coating with a sealant to provide a second layer. The sealant can be coated by melt coating techniques.

In use, the coated fertilizer is applied to the locus of a plant or seed, in particular the soil of a plant or seed to be fertilized.

The fertilizer coatings are biodegradable, and leave no toxic residues in the soil. Fertilizers coated with such coatings further have sustainable nutrient release rates. Further, the granule coating methods described herein allow the manufacture of coated fertilizers having an even and thin coating, which allows coated fertilizers to contain a high nitrogen content. For example, when the fertilizer is urea, the nitrogen content of the coated fertilizer is 42 wt. % to 45 wt. %. Fertilizer coatings containing lignin can suppress NOx production.

The coated fertilizers having sustained release properties are further illustrated by the following non-limiting examples.

The methods disclosed herein can, in some aspects, be performed on an industrial scale.

ASPECTS

Disclosed herein are at least the following aspects:

Aspect 1: A coated fertilizer comprising:
a fertilizer granule; and
a coating disposed on a surface of the fertilizer granule, wherein the coating comprises
a poly(lactic acid);
a second polymer comprising a poly(butylene succinate), a cellulose triacetate,
or a combination comprising at least one of the foregoing; and
a sealant.

Aspect 2: The coated fertilizer of aspect 1, wherein the sealant comprises a wax.

Aspect 3: The coated fertilizer of aspect 1 or 2, wherein the second polymer comprises poly(butylene succinate).

Aspect 4: The coated fertilizer of any one of aspect 1 to 3, wherein the second polymer comprises cellulose triacetate.

Aspect 5: The coated fertilizer of any one of aspects 1 to 4, wherein a weight ratio of the poly(lactic acid) to the second polymer is 10:1 to 1:10.

Aspect 6: The coated fertilizer of any one of aspects 1 to 5, wherein an amount of the coating is 0.5 wt. % to 6 wt. %, based on the total weight of the coated fertilizer.

Aspect 7: The coated fertilizer of any one of aspects 1 to 6, wherein the nitrogen content of the coated fertilizer is 42 wt. % to 45 wt. %, based on the total weight of the coated fertilizer.

Aspect 8: The coated fertilizer of any one of aspects 1 to 7, wherein the coating comprises the poly(lactic acid), the second polymer, and the sealant in combination in a single layer.

Aspect 9: The coated fertilizer of any one of aspects 1 to 7, wherein the coating comprises:
a first layer disposed on the fertilizer granule, wherein the first layer comprises the poly(lactic acid) and the second polymer; and
a second layer disposed on the first layer, wherein the second layer comprises the sealant.

Aspect 10: The coated fertilizer of any one of aspects 1 to 7, wherein the coating comprises:
a first layer disposed on the fertilizer granule, wherein the first layer comprises the poly(lactic acid) or the second polymer;
a second layer disposed on the first layer, wherein the second layer comprises the second polymer or the poly(lactic acid), provided that the first layer is not the same as the second layer; and
a third layer disposed on the second layer, wherein the third layer comprises the sealant.

Aspect 11: The coated fertilizer of any one of aspects 1 to 10, wherein the coating has a total thickness of 20 to 70 micrometers.

Aspect 12: A method of manufacture of the coated fertilizer any one of aspects 1 to 11, the method comprising:
combining the poly(lactic acid), the second polymer, and the sealant to provide a coating composition; and
depositing the coating composition as a layer on a plurality of fertilizer granules to provide the coated fertilizer.

Aspect 13: The method of aspect 12, wherein the depositing comprises spraying the coating composition.

Aspect 14: A method of making the coated fertilizer of any one of aspects 1 to 11, the method comprising:
dissolving the poly(lactic acid) and the second polymer in a solvent to provide a solution;
depositing the solution on a fertilizer granule to form a first layer; and
depositing a sealant on the first layer-coated fertilizer granules to form a second layer.

Aspect 15: A coated fertilizer comprising:
a fertilizer granule; and
a coating disposed on the fertilizer granule, wherein the coating comprises
lignin, starch acetate, or a combination thereof; and
a second polymer comprising a poly(lactic acid), a poly(butylene succinate), a cellulose triacetate, a poly(caprolactone), a poly(butylene terephthalate adipate), a cellulose acetate, or a combination comprising at least one of the foregoing.

Aspect 16: The coated fertilizer of aspect 15, wherein the coating further comprises a sealant.

Aspect 17: The coated fertilizer of aspect 16, wherein the sealant comprises a wax.

Aspect 18: The coated fertilizer of any one of aspects 15 to 17, wherein an amount of the coating is 0.5 wt. % to 10 wt. %, based on the total weight of the coated fertilizer.

Aspect 19: The coated fertilizer of any one of aspects 15 to 18, wherein the weight ratio of the lignin, starch acetate, or a combination thereof to the second polymer is 1:10 to 10:1.

Aspect 20: The coated fertilizer of any one of aspects 15 to 19, wherein the second polymer comprises a combination of poly(lactic acid) and poly(butylene succinate).

Aspect 21: The coated fertilizer of any one of aspects 15 to 20, wherein the coating comprises:
a first layer disposed on the fertilizer granule, wherein the first layer comprises the lignin, starch acetate, or a combination thereof;
a second layer disposed on the first layer, wherein the second layer comprises one or more second polymers; and
optionally, a third layer, wherein the third layer comprises an additional second polymer.

Aspect 22: The coated fertilizer of aspect 21, wherein the coating further comprises a sealant layer disposed on the second layer or third layer, wherein the sealant layer comprises a sealant.

Aspect 23: The coated fertilizer of aspect 21, wherein the second layer comprises poly(butylene succinate); and the third layer is present, and comprises poly(lactic acid).

Aspect 24: A method of making the coated fertilizer of aspect 21, the method comprising dissolving the lignin, starch acetate, or a combination thereof in a first solvent to provide a first solution; depositing the first solution on a plurality of fertilizer granules to form a first layer; dissolving the one or more second polymers in a second solvent to provide a polymer solution; depositing the polymer solution on the first layer-coated fertilizer granules to provide a second layer; optionally dissolving an additional second polymer in a third solvent to provide an additional polymer solution; and depositing the additional polymer solution on the second layer-coated fertilizer granules to provide a third layer.

Aspect 25: The method of aspect 24, further comprising depositing a sealant on the second layer-coated fertilizer granules or the third layer-coated fertilizer granules.

Aspect 26: The method of aspect 24, wherein the depositing comprises spraying the coating composition.

Aspect 27: The method of any one of aspect 24 to 26, wherein the second polymer comprises poly(lactic acid), poly(butylene succinate), poly (butylene terephthalate adipate), cellulose acetate, or a combination thereof, and the second solvent comprises dichloromethane.

Aspect 28: A method of manufacture of the coated fertilizer of aspect 21, the method comprising: dissolving the lignin, starch acetate, or a combination thereof in a first solvent to provide a first solution; depositing the first solution on a plurality of fertilizer granules to form a first layer; dissolving at least two second polymers in a solvent to provide a second solution; and depositing the second solution on the first layer-coated fertilizer granules to provide the coated fertilizer.

Aspect 29: The method of aspect 28, further comprising depositing a sealant on the coated fertilizer.

Aspect 30: The method of aspect 28 or 29, wherein the at least two second polymers comprise two of poly(lactic acid), poly(butylene succinate), poly (butylene terephthalate adipate), cellulose acetate; and the second solvent comprises dichloromethane.

Aspect 31: A method of manufacture of the coated fertilizer of aspect 21, the method comprising contacting the lignin, starch acetate, or combination thereof, and cellulose triacetate, poly(caprolactone), or a combination thereof in a solvent to provide a coating composition; depositing the coating composition on a plurality of fertilizer granules to provide the coated fertilizer.

Aspect 32: The method of aspect 31, further comprising depositing a sealant on the coated fertilizer.

EXAMPLES

The materials used in the Examples are described in Table 1.

TABLE 1

| Component | Chemical Description | Source |
| --- | --- | --- |
| CA (high) | Cellulose acetate (Grade no.) | Eastman |
| CA (low) | Cellulose acetate (Grade no.) | Eastman |
| CTA | Cellulose triacetate | Fischer Scientific |
| Lignin-1 | Hydrophobic Kraft lignin, protobind* 1000 | Asian Lignin Ltd |
| Lignin-2 | Hydrophobic Kraft lignin, Indulin* AT | Meadwestwaco |
| PBS (high) | Poly(butylene succinate) | Danimer |
| PBS (medium) | Poly(butylene succinate) | Danimer |
| PLA (high) | Poly(lactic acid) | Natureworks |
| PLA (low) | Poly(lactic acid) | Natureworks |
| PLA Repro-pkg | Recycled poly(lactic acid) | Phoenix recycling |
| PLA Repro-box | Recycled poly(lactic acid) | Phoenix recycling |
| PLA Repro-label | Recycled poly(lactic acid) | Phoenix recycling |
| PLA 2500 HP | Recycled poly(lactic acid), high crystalline grade of PLA | Natureworks |
| PLA 3100 HP | Recycled poly(lactic acid), high crystalline grade of PLA | Natureworks |
| PBAT | Poly(butylene terephthalate adipate) (Ecoflex*) | BASF |
| C30+ | Alpha-olefin wax | CP-Chem |
| 7089A | Petroleum wax, congealing point, 148 F. (64° C.) | International Group, Inc. |
| R-4408A | Wax, drop melt point, 165 F. (74° C.) | International Group, Inc. |

TABLE 1-continued

| Component | Chemical Description | Source |
| --- | --- | --- |
| R-3053A | Petroleum wax, congealing point, 164 F. (73° C.) | International Group, Inc. |
| Acetone | | Aldrich |
| Dichloromethane | | Aldrich |

General Procedures

Preparation of coating formulations. Lignin solution was made using acetone-water solvent mixtures in ratios from 80:20 to 90:10 at room temperature with stirring for 12 hours. CA solutions were made using acetone solvent at 60° C. with gentle stirring at 100 RPM for 60 minutes until complete dissolution was observed. PBS (at 40° C.), PLA (at room temperature), CTA (at 40° C.), PBAT (at 40° C.) as well as their respective blend solutions (at 40° C.) were made using dichloromethane solvent with gentle stirring at 100 revolutions per minute (rpm) for 60 minutes until complete dissolution was observed.

Coating procedure. Except in the case of drip coating experiments for CA, both polymer and lignin solutions were coated using an air atomized spray onto the urea granules placed in a rotating drum. Experiments where lignin, polymer, and wax were all used, for a sequential coating process, lignin was coated first followed by a polymer or a polymer blend and finally melt coating of wax; and for a simultaneous process, a blend of lignin and a polymer or a polymer blend was coated first followed by melt coating of wax.

Accelerated nutrient release test. The test is used to mimic a release profile of nutrient at given time intervals. The time intervals that samples were taken and analyzed were 2 hours, 4 hours, and 24 hours. A 5% dilute citric acid solution in water was recirculated across a bed of product granules and the filtrate was analyzed for nitrogen content. The citric acid simulates the soil conditions that a product would be subjected to during normal application.

Three, seven, and 14 day oven test. A container was charged with 100 g of sample and 500 mL of water. The container was then sealed and placed in an over at 100° F. (38° C.). Nitrogen release was measured periodically after 3 days, 7 days, or 14 days.

Comparative Example A. Drip Coating

Coating formulations were added dropwise to urea granules in a rotary drum. An air blower was used in the drum to remove the solvent vapors. For coatings containing both CA and lignin, the urea was first coated by lignin followed by CA. The addition of wax sealant was also performed as the final coating by melting the wax and pouring the melted wax into the rotating drum containing polymer (and/or lignin) coated urea. In these experiments, the lignin percentage was varied from 0 to 3%, CA was varied between 0 to 6%, and the sealant was varied between 0 to 1.5%.

None of the samples coated by the drip process led to uniform coating. Further measurements were not carried out. FIG. 1 shows a representative example of a sample coated with 2% lignin, 2% CA, and 0.5% IGI-7089A with drip coating. Coating defects such as dark and light contrast were observed. These defects indicate unevenness of the coating. Agglomeration of the granules was also observed.

Comparative Examples 1-25 and Example 26. Cellulose Acetate with/without Lignin

Figure 2:
FIG. 2 is a microscopic image of urea granules coated with 2.5 wt. % of lignin, 3 wt. % of cellulose acetate, and 0.5 wt. % of wax manufactured by spray coating.

Coating formulations were sprayed onto urea granules. The total coating was varied between 5.5 and 7.5 wt. %. Wax was varied between 0.5 and 1.5 wt. %. Lignin was varied between 0 and 3 wt. %, and CA was varied between 3 and 6 wt. %. The coating formulations and the accelerated nutrient release test results are shown in Table 2. The coated sample of example 1 was also shown in FIG. 2. No major coating defects were observed.

TABLE 2

| Ex. | Lignin/CA/wax (wt. %) | Total coating (wt. %) | Lignin Type | CA Type | Sealant Type | N (wt. %) | Accelerated release test (% N release) 2 hr | 4 hr | 24 hr |
|---|---|---|---|---|---|---|---|---|---|
| 1 | 2.5/3/0.5 | 6 | Lignin-1 | High | 7089A | 43.99 | 6.13 | 25.96 | 97.4 |
| 2 | 2/3/0.5 | 5.5 | Lignin-1 | High | 7089A | 43.75 | *** | *** | *** |
| 3 | 2/3/1 | 6 | Lignin-1 | High | 7089A | 44.34 | *** | *** | *** |
| 4 | 2.5/3/0.5 | 6 | Lignin-1 | High | 7089A | 44.25 | 4.11 | 12.48 | 100.00 |
| 5 | 2.5/3/1 | 6.5 | Lignin-1 | High | 7089A | 44.00 | 1.62 | 4.29 | 100.00 |
| 6 | 2.5/3/0.5 | 6 | Lignin-2 | High | 7089A | 44.14 | 1.65 | 9.39 | 100.00 |
| 7 | 2.5/3/1 | 6.5 | Lignin-2 | High | 7089A | 44.19 | 2.57 | 7.76 | 100.00 |
| 8 | 3/3/0.5 | 6.5 | Lignin-1 | High | 7089A | 43.77 | 3.95 | 11.54 | 100.00 |
| 9 | 3/3/1 | 7 | Lignin-1 | High | 7089A | 43.18 | 1.06 | 3.54 | 100.00 |
| 10 | 2/4/0.5 | 6.5 | Lignin-1 | High | 7089A | 43.51 | 3.56 | 9.45 | 99.55 |
| 11 | 2/4/1 | 7 | Lignin-1 | High | 7089A | 43.23 | 2.47 | 9.02 | 100.00 |
| 12 | 0/6/0.5 | 6.5 | *** | High | 7089A | 43.40 | 6.46 | 22.15 | 100.00 |
| 13 | 0/6/1 | 7 | *** | High | 7089A | 43.48 | 3.27 | 14.44 | 100.00 |
| 14 | 3/3/0.5 | 6.5 | Lignin-1 | High | 7089A | 43.51 | *** | *** | *** |
| 15 | 3/3/1 | 7 | Lignin-1 | High | 7089A | 43.52 | 2.04 | 5.69 | 91.43 |
| 16 | 2/4/0.5 | 6.5 | Lignin-1 | Low | 7089A | 43.30 | *** | *** | *** |
| 17 | 2/4/1 | 7 | Lignin-1 | Low | 7089A | 43.66 | 1.47 | 6.5 | 92.08 |
| 18 | 3/3/0.5 | 6.5 | Lignin-1 | Low | 7089A | 43.52 | *** | *** | *** |
| 19 | 3/3/1 | 7 | Lignin-1 | Low | 7089A | 42.98 | *** | *** | *** |
| 20 | 2/4/0.5 | 6.5 | Lignin-1 | Low | 7089A | 43.47 | *** | *** | *** |
| 21 | 2/4/1 | 7 | Lignin-1 | Low | 7089A | 42.83 | *** | *** | *** |
| 22 | 0/5/1.5 | 6.5 | *** | Low | R-4408A | 43.74 | *** | *** | *** |
| 23 | 0/5/1.5 | 6.5 | *** | Low | R-3053A | 43.57 | *** | *** | *** |
| 24 | 3/3/1.5 | 7.5 | Lignin-1 | Low | R-4408A | 43.46 | 1.99 | 36.37 | 96.64 |
| 25 | 3/3/1.5 | 7.5 | Lignin-1 | Low | R-3053A | 43.48 | 3.56 | 9.16 | 95.25 |
| 26 | 3/3/1.5 | 7.5 | Lignin-1 | High | C30+ | 43.79 | 2.64 | 39.69 | 74.07 |

*** Sample was observed to leak when placed in water under an optical microscope. Accordingly, the samples were not tested.

As can be seen from the data in Table 2, a combination of lignin, cellulose acetate, and a wax sealant (Example 26) was most effective to delay nitrogen release.

Comparative Examples 27-36. Cellulose Triacetate with/without Lignin

Granular urea was coated with various cellulose triacetate coating systems. In these experiments, the lignin percentage was varied between 0 and 3 wt. %, CTA or CTA-PBS or CTA-PLA was constant at 3 wt. % and the sealant was constant at 1.5 wt. %. If present, lignin-1 was used. The coating formulations and the nitrogen release test results are shown in Table 3. The seven day release results are also illustrated graphically in FIGS. 3 and 4.

TABLE 3

| Ex. | L/CTA/PBS/PLA/W* (wt. %) | Polymer Type | Coating (wt. %) | Sealant Type | Sealant (wt. %) | N (wt. %) | Accelerated Nutrient Release Test, % 2 hr | 4 hr | 24 hr | 7-Day Release test, % (Oven) 3 Day | 7 Day |
|---|---|---|---|---|---|---|---|---|---|---|---|
| 27 | 3/3/0/0/1.5 | CTA | 7.5 | R-3053A | 1.5 | 43.55 | 1.1 | 5.41 | 70.28 | 62.34 | 88.91 |
| 28 | 3/1.5/1.5/0/1.5 | PBS (high) | 7.5 | R-3053A | 1.5 | 43.35 | 1.69 | 3.03 | 27.16 | 16.37 | 37.67 |
| 29 | 3/1.5/1.5/0/1.5 | PBS (med) | 7.5 | R-3053A | 1.5 | 43.12 | 1.29 | 2.07 | 13.94 | 15.5 | 22.74 |
| 30 | 3/1.5/0/1.5/1.5 | PLA (high) | 7.5 | R-3053A | 1.5 | 43.22 | 0.56 | 0.9 | 5.45 | 1.3 | 8.73 |
| 31 | 3/1.5/0/1.5/1.5 | PLA (low) | 7.5 | R-3053A | 1.5 | 43.24 | 0.33 | 0.4 | 4.42 | 0.19 | 3.85 |
| 32 | 0/3/0/0/1.5 | CTA | 4.5 | R-3053A | 1.5 | 44.16 | 2.56 | 33.35 | 93.27 | 91.94 | 95.39 |

TABLE 3-continued

| L/CTA/PBS/PLA/W* Ex. (wt. %) | Polymer Type | Coating (wt. %) | Sealant Type | Sealant (wt. %) | N (wt. %) | Accelerated Nutrient Release Test, % | | | 7-Day Release test, % (Oven) | |
|---|---|---|---|---|---|---|---|---|---|---|
| | | | | | | 2 hr | 4 hr | 24 hr | 3 Day | 7 Day |
| 33 0/1.5/1.5/0/1.5 | PBS(high) | 4.5 | R-3053A | 1.5 | 44.31 | 17.62 | 26.53 | 61.48 | 51.49 | 75.74 |
| 34 0/1.5/1.5/0/1.5 | PBS (med) | 4.5 | R-3053A | 1.5 | 44.48 | 6.03 | 9.78 | 56.58 | 29.32 | 66.93 |
| 35 0/1.5/0/1.5/1.5 | PLA (high) | 4.5 | R-3053A | 1.5 | 44.42 | 0.75 | 1.44 | 11.99 | 3.8 | 12.36 |
| 36 0/1.5/0/1.5/1.5 | PLA (low) | 4.5 | R-3053A | 1.5 | 44.2 | 0.14 | 0.43 | 24.54 | 0.94 | 23.2 |

*"L" refers to lignin and "W" refers to wax.

Figure 3:
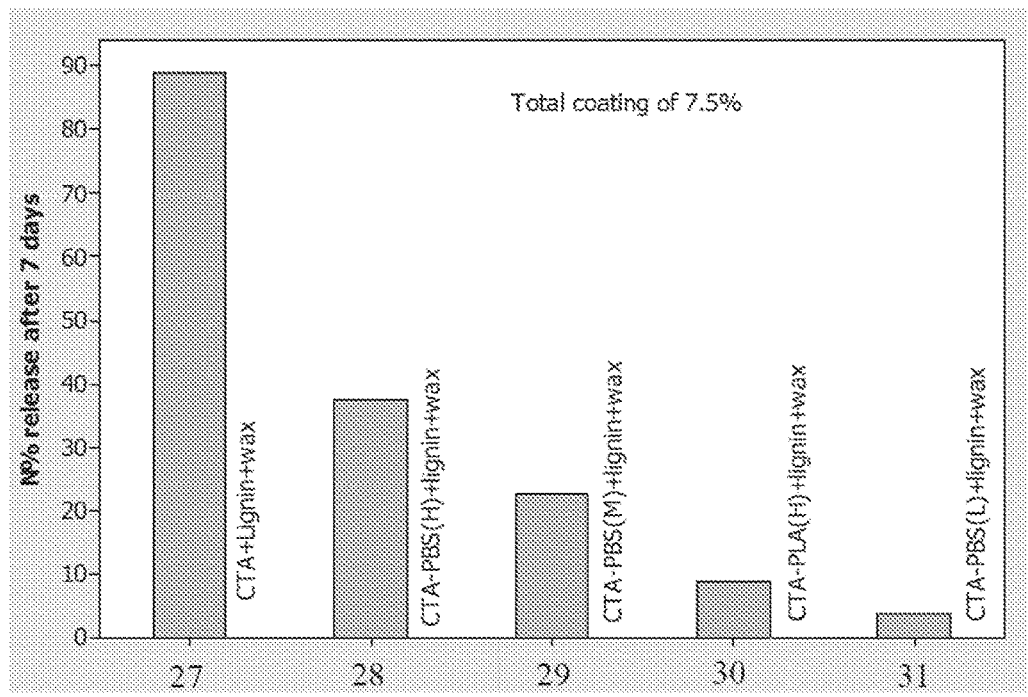
FIG. 3 shows percent nitrogen release from urea granules coated with 3.0 wt % of lignin, 3.0 wt. % of cellulose triacetate or cellulose triacetate blends, and 1.5 wt % wax after 7 days at 100° F. (38° C.) This example is 7.5 wt % total coating, as the wax was not part of the blend, but added as a second layer.
Figure 4:
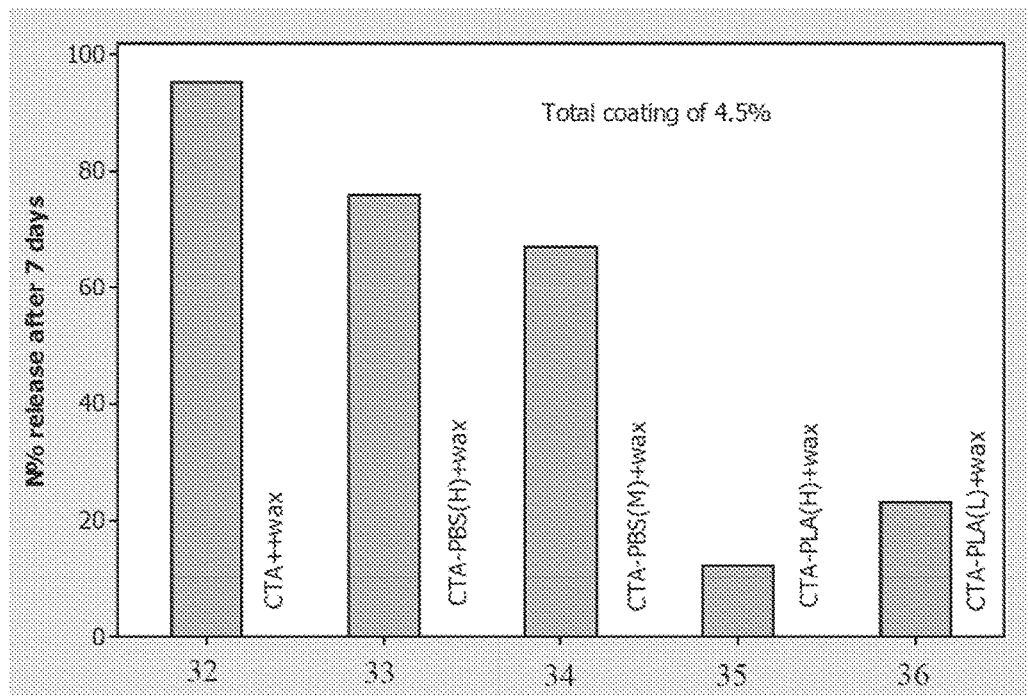
FIG. 4 shows percent nitrogen release from urea granules coated with 3.0 wt. % of cellulose triacetate or cellulose triacetate blends and 1.5% wax after 7 days at 100° F. (38° C.). This example is a 4.5 wt % total coating, as the wax was not part of the blend, but was added as a second layer.

FIG. 3 shows that at the 7.5 wt. % coating level, the lignin/CTA/wax coating performance was inferior to the lignin/PBS/CTA/wax in retaining urea based on the 7 day oven test. FIG. 4 shows that at 4.5 wt. % coating level, PLA/CTA blends performed better than PBS/CTA blends in retaining urea based on the 7 day oven test. The data also indicates that the release performance was improved with the addition of a lignin precoat.

Comparative Examples 37-40. PBAT with/without Lignin

Granular urea was coated with various PBAT systems with or without lignin. If present, lignin-1 was used. In these examples, the lignin percentage was varied between 0 and 3 wt. %. PBAT was varied between 3 and 5 wt. % and the sealant was kept constant at 1.5 wt. %. The total coating was varied between 6.5 wt. % and 7.5 wt. %. The coating formulations and the nitrogen release test results are shown in Table 4.

TABLE 4

| L/P/W* Ex. (wt. %) | Coating (wt. %) | Sealant Type | N (wt. %) | Accelerated Nutrient Release Test, % | | | 7-Day Release test, % (Oven Test) | |
|---|---|---|---|---|---|---|---|---|
| | | | | 2 hr | 4 hr | 24 hr | 3 Day | 7 Day |
| 37 3/3/1.5 | 7.5 | R-3053A | 42.68 | 6.57 | 16.71 | 74.67 | 88.26 | 95.77 |
| 38 3/3/1.5 | 7.5 | C30+ | 42.74 | 6.45 | 22.03 | 80.16 | 98.13 | 99.80 |
| 39 0/5/1.5 | 6.5 | R-3053A | 44.02 | 70.40 | 93.68 | 100 | 92.61 | 95.82 |
| 40 0/5/1.5 | 6.5 | C30+ | 43.52 | 13.79 | 25.66 | 93.97 | 55.15 | 89.69 |

*"L" refers to lignin, "P" refers to "polymer" and "W" refers to wax.

Spray coating of lignin and PBAT followed by wax coating showed positive results based on 4 hr accelerated test data. However, 3 day and 7 day release tests at 100° F. (38° C.) performed less than desirably.

Examples 41-81. PBS with/without Lignin

In these examples, the total coating was varied between 2.2 to 7.5 wt. %. Lignin (lignin-1, L) was varied between 0 and 3 wt. %, PBS (P) was varied between 1.2 to 4 wt. %, and the sealant (W) was varied between 0.5 and 1.5 wt. %. The coating formulations and the nitrogen release test results are shown in Table 5.

TABLE 5

| L/P/W* Ex. (wt. %) | PBS Type | Total coating (wt. %) | Sealant Type | N (wt. %) | Accelerated Nutrient Release Test, % | | | 7-Day (Oven Test), % | |
|---|---|---|---|---|---|---|---|---|---|
| | | | | | 2 hr | 4 hr | 24 hr | 3 Day | 7 Day |
| 41 3/3/1.5 | High | 7.5 | R-3053A | 42.86 | 0.58 | 2.33 | 20.42 | 22.09 | 37.98 |
| 42 2/3/1.5 | High | 6.5 | C30+ | 43.61 | 0.18 | 0.37 | 54.41 | 26.87 | *** |
| 43 0/3/1.5 | High | 4.5 | C30+ | 44.29 | 1.23 | 19.14 | 51.05 | 16.96 | 60.26 |
| 44 0/2/1.5 | High | 3.5 | C30+ | 44.85 | 2.19 | 5.1 | 57.63 | 24.76 | 63.99 |
| 45 3/3/1.5 | Medium | 7.5 | C30+ | 43.37 | 0.39 | 6.69 | 57.39 | 21.83 | 76.31 |
| 46 3/3/1.5 | Medium | 7.5 | R-3053A | 42.99 | 0.38 | 0.64 | 7.84 | 5.75 | 13.42 |
| 47 2/3/1.5 | Medium | 6.5 | C30+ | 43.29 | 0.26 | 1.39 | 82.96 | 18.13 | 71.5 |

TABLE 5-continued

| Ex. | L/P/W* (wt. %) | PBS Type | Total coating (wt. %) | Sealant Type | N (wt. %) | Accelerated Nutrient Release Test, % 2 hr | 4 hr | 24 hr | 7-Day (Oven Test), % 3 Day | 7 Day |
|---|---|---|---|---|---|---|---|---|---|---|
| 48 | 0/3/1.5 | Medium | 4.5 | C30+ | 44.26 | 0.26 | 0.77 | 68.82 | 3.54 | 34.46 |
| 49 | 0/4/1.5 | Medium | 5.5 | C30+ | 43.97 | 1.19 | 1.68 | 24.65 | 8.21 | 41.59 |
| 50 | 0/3/1.5 | Medium | 4.5 | R-3053A | 44.32 | 7.85 | 13.96 | 32.66 | 25.27 | 53.19 |
| 51 | 3/3/1.5 | High | 7.5 | C30+ | 43.33 | 1.09 | 3.28 | 56.59 | 35.23 | 79.93 |
| 52 | 3/1.5/1.5 | High | 6 | C30+ | 43.64 | 0.08 | 3.17 | 55.58 | 38.13 | 81.39 |
| 53 | 2/2/1.5 | High | 5.5 | C30+ | 43.95 | 0.61 | 1.48 | 56.05 | 35.54 | 81.66 |
| 54 | 2.5/3/1.5 | High | 7 | R-3053A | 43.01 | 4.28 | 12.49 | 27.65 | 47.26 | 71.56 |
| 55 | 2.5/1.5/1.5 | High | 6.5 | R-3053A | 44.13 | 3.16 | 8.90 | 24.50 | 46.64 | 75.77 |
| 56 | 2.5/2.63/1.5 | High | 6.63 | R-3053A | 43.30 | 2.51 | 7.38 | 68.06 | 38.34 | 64.14 |
| 57 | 0/1.2/1 | Medium | 2.2 | C30+ | 44.87 | 9.01 | 25.44 | 78.02 | 43.85 | 78.37 |
| 58 | 2.5/1.5/1 | High | 6.5 | R-3053A | 43.63 | 2.28 | 7.15 | 42.09 | 52.69 | 85.38 |
| 59 | 2.5/1.88/0.5 | Medium | 4.88 | R-3053A | 43.68 | 5.42 | 13.57 | 39.98 | 55.28 | 87.02 |
| 60 | 2.5/3/1.5 | Medium | 7 | C30+ | 43.29 | 2.74 | 8.94 | 36.79 | 56.22 | 88.54 |
| 61 | 2.5/1.5/0.5 | High | 4.5 | R-3053A | 43.79 | 2.30 | 9.29 | 30.94 | 61.14 | 88.71 |
| 62 | 2.5/2.63/0.5 | Medium | 5.68 | C30+ | 43.18 | 3.29 | 13.58 | 42.36 | 72.26 | 94.03 |
| 63 | 2.5/3/1 | Medium | 6.5 | C30+ | 42.89 | 3.23 | 7.61 | 33.37 | 58.35 | 90.11 |
| 64 | 2.5/1.88/0.5 | High | 4.88 | C30+ | 43.87 | 4.32 | 17.27 | 57.02 | 80.53 | 94.79 |
| 65 | 2.5/1.88/1 | Medium | 5.38 | C30+ | 43.62 | 2.71 | 8.33 | 31.26 | 66.26 | 92.63 |
| 66 | 2.5/1.5/1.5 | Medium | 5.5 | C30+ | 43.83 | 1.68 | 7.29 | 66.10 | 59.68 | 91.4 |
| 67 | 2.5/3/1 | High | 6.5 | R-3053A | 43.60 | 5.86 | 13.28 | 54.82 | 56.85 | 84.69 |
| 68 | 2.5/1.5/1 | Medium | 5 | R-3053A | 44.34 | 3.26 | 9.47 | 69.23 | 78.01 | 91.74 |
| 69 | 2.5/3/1.5 | High | 7 | C30+ | 43.35 | 2.85 | 8.30 | 55.12 | 59.76 | 88.51 |
| 70 | 2.5/1.5/0.5 | Medium | 4.5 | C30+ | 44.37 | 2.15 | 5.31 | 67.25 | 77.14 | 93.11 |
| 71 | 2.5/1.5/1.5 | Medium | 5.5 | C30+ | 44.18 | 0.44 | 0.90 | 69.45 | 71.21 | 92.55 |
| 72 | 2.5/1.5/1 | High | 5 | C30+ | 44.31 | 1.72 | 6.32 | 85.50 | 79.2 | 94.42 |
| 73 | 2.5/2.63/1 | High | 6.13 | C30+ | 43.36 | 3.38 | 13.43 | 89.32 | 82.98 | 96.26 |
| 74 | 2.5/3/0.5 | Medium | 6 | R-3053A | 43.51 | 4.07 | 9.05 | 90.70 | 82.75 | 93.87 |
| 75 | 2.5/3/0.5 | High | 6 | R-3053A | 43.24 | 3.78 | 13.85 | 91.23 | 74.14 | 94.05 |
| 76 | 0/3/1.5 | High | 4.5 | R-3053A | 44.55 | 25.96 | 38.72 | 65.53 | 61.00 | 80.50 |
| 77 | 0/1.2/1 | High | 2.2 | R-3053A | 45.08 | 23.08 | 45.43 | 82.67 | 68.06 | 82.12 |
| 78 | 0/1.7/0.5 | High | 2.2 | R-3053A | 44.99 | 35.67 | 58.86 | 91.01 | 79.05 | 90.70 |
| 79 | 0/1.2/1 | Medium | 2.2 | R-3053A | 44.97 | 9.49 | 25.69 | 78.55 | 57.38 | 78.98 |
| 80 | 0/1.7/0.5 | Medium | 2.2 | R-3053A | 44.72 | 14.48 | 27.96 | 72.18 | 53.96 | 78.22 |
| 81 | 0/1.7/0.5 | High | 2.2 | C30+ | 44.95 | 19.98 | 39.56 | 82.17 | 62.24 | 88.29 |

*"L" refers to lignin, "P" refers to "polymer" and "W" refers to wax.

Figure 5:
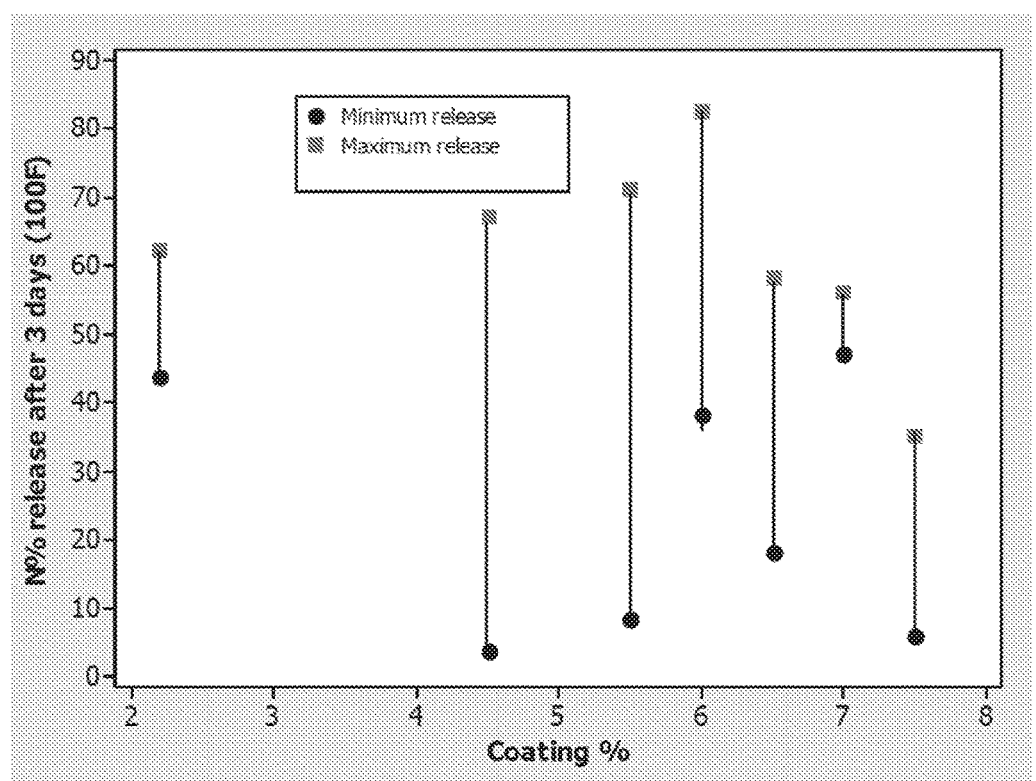
FIG. 5 is a graph of percent nitrogen release after 3 days at 100° F. (38° C.) versus coating wt. % for urea granules coated with poly(butylene succinate) ("PBS") and wax and optionally lignin.

The samples can be segmented into 3 sections based on the 3 day release of oven test results as follows: Examples 41-50 (less than 30% release), Examples 51-57 (30% to 50% release), and Examples 58-62 (above 50% release). The results are also illustrated graphically in FIG. 5. There were some positive results in both the 24 hour accelerated release test as well as the 7 day oven test.

Examples 82-99. PLA with/without Lignin

Figure 6:
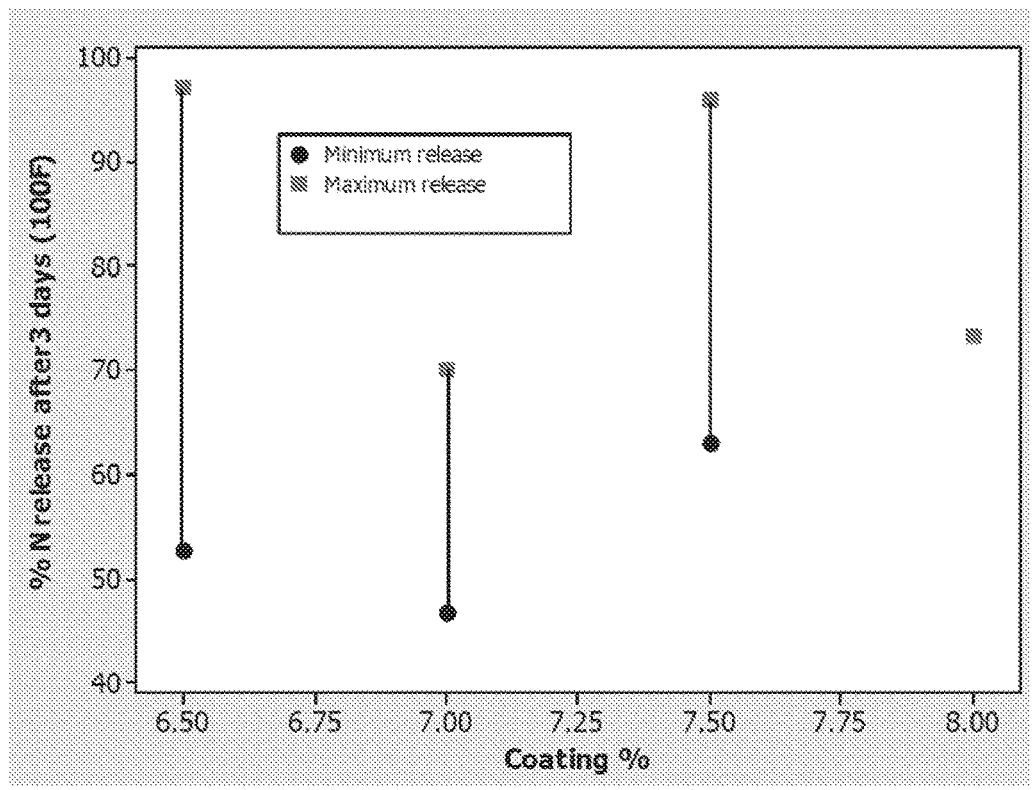
FIG. 6 is a graph of percent nitrogen release after 3 days at 100° F. (38° C.) versus coating wt. % for urea granules coated with poly(lactic acid) ("PLA") and wax and optionally lignin.

In these examples, the total coating was varied between 6.5 to 8 wt. %. Lignin (lignin-1, L) was varied between 0 and 3 wt. %, PLA (P) was varied between 2 and 5 wt. %, and the sealant (W) was varied between 1.5 and 2 wt. %. The coating formulations and thed release test results are shown in Table 6. The results are also illustrated graphically in FIG. 6.

TABLE 6

| Ex. | L/P/W (wt. %) | Coating (wt. %) | PLA Type | Sealant Type | N (wt. %) | Accelerated Nutrient Release Test, % 2 hr | 4 hr | 24 hr | 7-Day (Oven Test), % 3 Day | 7 Day |
|---|---|---|---|---|---|---|---|---|---|---|
| 82 | 3/2/2 | 7 | (Low) | C30+ | 43.85 | 0.35 | 0.37 | 24.24 | 46.69 | 81.42 |
| 83 | 2.5/3/1.5 | 7 | (High) | C30+ | 43.23 | 3.11 | 10.34 | 70.58 | 54.69 | 88.15 |
| 84 | 0/5/1.5 | 6.5 | (High) | C30+ | 43.26 | 14.59 | 31.68 | 90.01 | 52.84 | 74.60 |
| 85 | 2.5/3/1.5 | 7 | (Low) | C30+ | 43.82 | 5.45 | 11.23 | 65.93 | 69.72 | 92.94 |
| 86 | 3/3/1.5 | 7.5 | (High) | R-3053A | 43.09 | 1.85 | 7.24 | 54.86 | 69.50 | 87.58 |
| 87 | 2/4/1.5 | 7.5 | (High) | C30+ | 43.28 | 8.94 | 22.80 | 68.21 | 62.97 | 89.85 |
| 88 | 3/2/1.5 | 6.5 | (High) | R-3053A | 44.08 | 3.63 | 9.11 | 59.16 | 70.01 | 87.32 |
| 89 | 3/2/2 | 7 | (High) | R-3053A | 43.35 | 1.32 | 3.36 | 51.73 | 61.77 | 87.12 |

TABLE 6-continued

| Ex. | L/P/W (wt. %) | Coating (wt. %) | PLA Type | Sealant Type | N (wt. %) | Accelerated Nutrient Release Test, % 2 hr | 4 hr | 24 hr | 7-Day (Oven Test), % 3 Day | 7 Day |
|---|---|---|---|---|---|---|---|---|---|---|
| 90 | 3/2/2 | 7 | (Low) | C30+ | 43.45 | 0.96 | 1.13 | 39.03 | 68.31 | 92.82 |
| 91 | 3/3/1.5 | 7.5 | (Low) | R-3053A | 43.12 | 13.85 | 26.58 | 73.62 | 77.12 | 94.66 |
| 92 | 2/4/1.5 | 7.5 | (High) | R-3053A | 43.28 | 6.05 | 25.81 | 67.62 | 83.31 | 93.70 |
| 93 | 2/4/1.5 | 7.5 | (Low) | R-3053A | 43.09 | 13.84 | 45.83 | 94.26 | 95.92 | 97.13 |
| 94 | 2/4/1.5 | 7.5 | (Low) | C30+ | 43.00 | 9.39 | 27.01 | 77.72 | 90.96 | 98.39 |
| 95 | 0/5/1.5 | 6.5 | (High) | R-3053A | 43.16 | 19.77 | 50.83 | 81.29 | 84.50 | 89.56 |
| 96 | 0/5/1.5 | 6.5 | (Low) | R-3053A | 43.09 | 52.22 | 74.07 | 100.00 | 87.57 | 92.05 |
| 97 | 0/5/1.5 | 6.5 | (Low) | C30+ | 43.55 | 63.90 | 84.31 | 90.63 | 91.73 | 94.30 |
| 98 | 3/2/1.5 | 6.5 | (High) | R-3053A | 43.63 | 3.92 | 13.94 | 76.67 | 97.17 | 96.63 |
| 99 | 3/3/2 | 8 | (Low) | C30+ | 42.89 | 6.84 | 12.46 | 49.85 | 73.24 | 91.85 |

*"L" refers to lignin, "P" refers to "polymer" and "W" refers to wax.

The 4 hour measurements of the 24 hour accelerated release test and the 3 day measurements of the oven test yielded some positive results (approximately 50% release). Based on the 3 day release test results, the data are segmented into 3 sections: Examples 82-84 (release less than 55%), Examples 85-90 (release between 55 and 70%), and Examples 91-99 (release above 70%). The data show that the 7 day release test results at 100° F. (38° C.) were higher than desired rate.

Examples 100-113. PBS-PLA Blend with/without Lignin

Figure 7:
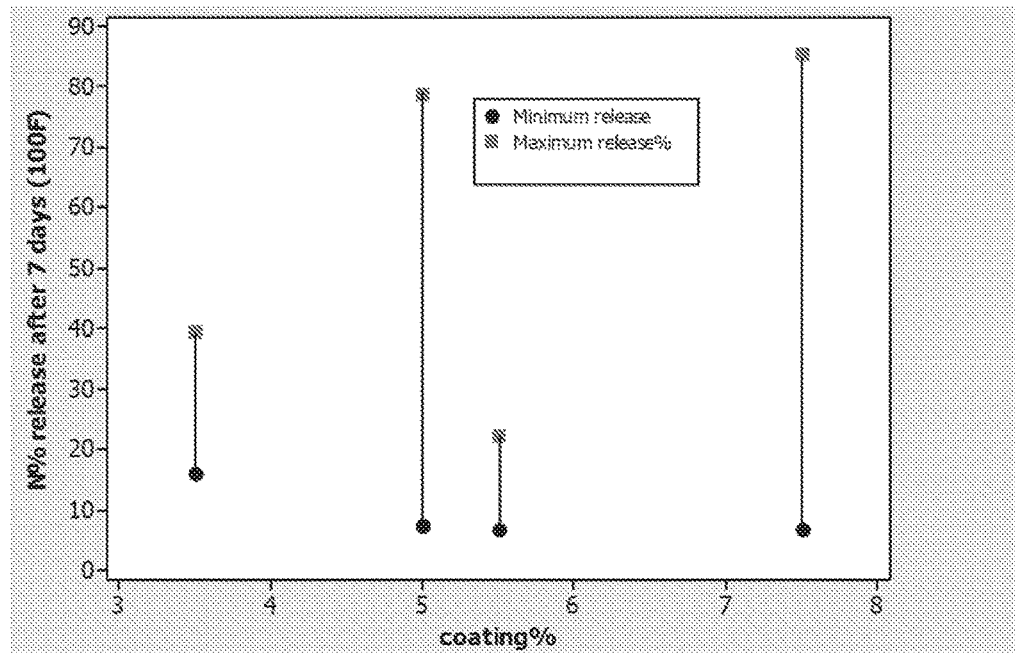
FIG. 7 is a graph of percent nitrogen release after 7 days at 100° F. (38° C.) versus coating wt. % for urea granules coated with PBS/PLA combinations and wax and optionally lignin.
Figure 8:
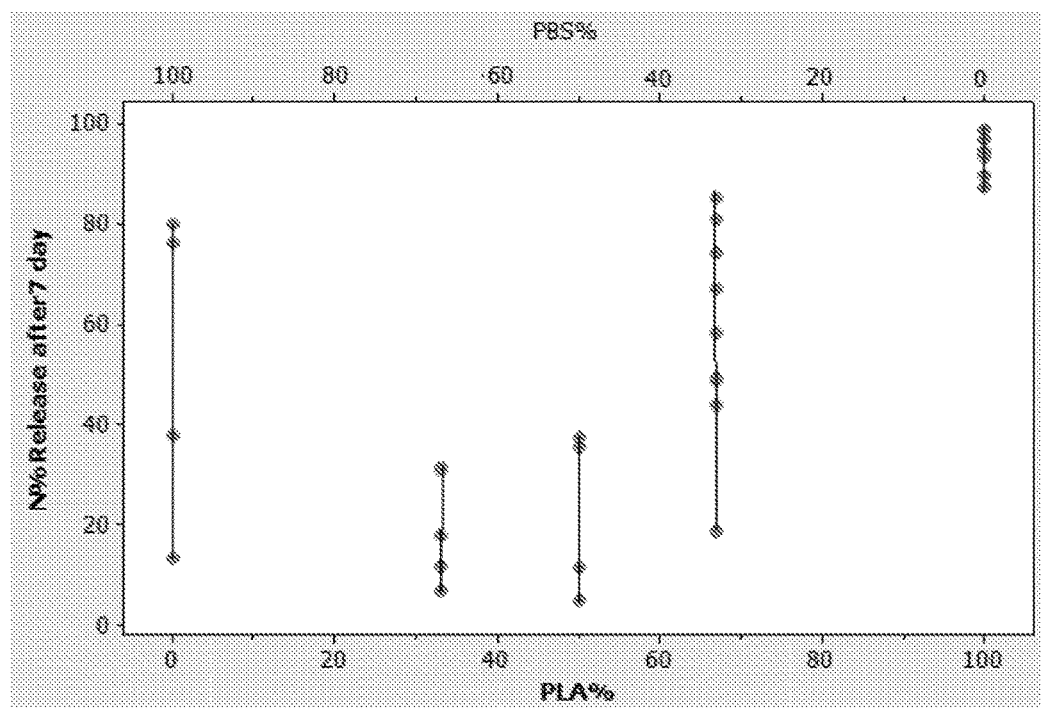
FIG. 8 is a graph showing percent nitrogen release results vs. percent PLA at 100° F. (38° C.) of urea granules coated with PLA/PBS combinations at a 7.5 wt. % total coating level, wherein the coating further includes wax and optionally lignin.

In these examples, the total coating was varied between 3.5 to 7.5 wt. %. Lignin (lignin-1, L) was varied between 0 and 3 wt. %, PLA was varied between 1 to 4 wt. %, PBS was varied between 1 and 2 wt. %, and the sealant (W) was varied between 1.5 and 2 wt. %. The coating formulations and the nitrogen release test results are shown in Table 7. The results are illustrated graphically in FIGS. 7 and 8.

TABLE 7

| Ex. | L/PLA/PBS/W* (wt. %) | Coating (wt. %) | Sealant Type | N (wt. %) | Accelerated Nutrient Release Test, % 2 hr | 4 hr | 24 hr | 7-Day (Oven Test), % 3 Day | 7 Day |
|---|---|---|---|---|---|---|---|---|---|
| 100 | 3/1/2/1.5 | 7.5 | R-3053A | 42.87 | 0.00 | 0.00 | 3.83 | 2.85 | 6.65 |
| 101 | 3/1.5/1.5/1.5 | 7.5 | R-3053A | 43.07 | 0.00 | 0.00 | 0.49 | 0.08 | 4.93 |
| 102 | 0/1.5/1.5/2 | 5 | C30+ | 43.98 | 0.75 | 1.50 | 4.66 | 1.89 | 7.70 |
| 103 | 0/1.5/1.5/2 | 5 | C30+ | 43.83 | 0.03 | 0.39 | 2.81 | 0.66 | 7.27 |
| 104 | 0/2/2/1.5 | 5.5 | C30+ | 43.63 | 0.16 | 0.35 | 3.72 | 0.00 | 6.85 |
| 105 | 3/1.5/1.5/1.5 | 7.5 | R-3053A | 42.74 | 0.89 | 1.05 | 30.15 | 4.36 | 11.26 |
| 106 | 3/1/2/1.5 | 7.5 | R-3053A | 42.77 | 0.00 | 0.00 | 0.84 | 0.00 | 11.63 |
| 107 | 3/1/2/1.5 | 7.5 | R-3053A | 42.73 | 0.44 | 0.44 | 32.83 | 2.92 | 17.97 |
| 108 | 0/4/2/1.5 | 7.5 | R-3053A | 42.66 | 2.26 | 3.20 | 16.67 | 10.62 | 18.49 |
| 109 | 0/1.5/1.5/2 | 5 | R-3053A | 44.00 | 0.39 | 1.49 | 7.35 | 8.37 | 18.56 |
| 110 | 0/1/1/1.5 | 3.5 | C30+ | 44.67 | 1.31 | 1.89 | 29.81 | 4.96 | 15.95 |
| 111 | 0/1/1/1.5 | 3.5 | C30+ | 44.62 | 0.45 | 0.92 | 8.27 | 2.87 | 16.51 |
| 112 | 0/2/2//1.5 | 5.5 | C30+ | 43.66 | 0.78 | 1.50 | 9.03 | 3.17 | 12.09 |
| 113 | 0/2/2/1.5 | 5.5 | R-3053A | 43.34 | 0.85 | 1.53 | 7.34 | 5.44 | 12.98 |
| 114 | 3/1/1/1.5 | 6.5 | R-3053A | 43.18 | 0.82 | 0.93 | 32.80 | 14.36 | 32.58 |
| 115 | 3/1/2/1.5 | 7.5 | R-3053A | 43.34 | 0.00 | 0.00 | 7.26 | 4.88 | 31.48 |
| 116 | 3/1.5/1.5/1.5 | 7.5 | R-3053A | 42.72 | 0.40 | 0.55 | 4.09 | 9.71 | 37.37 |
| 117 | 3/1/1/1.5 | 6.5 | R-3053A | 43.47 | 0.20 | 0.55 | 8.84 | 10.34 | 39.89 |
| 118 | 3/1.5/1.5/1.5 | 7.5 | R-3053A | 42.99 | 0.00 | 0.00 | 74.05 | 2.19 | 35.67 |
| 119 | 3/1/1/1.5 | 6.5 | R-3053A | 43.56 | 0.93 | 1.07 | 79.42 | 8.47 | 32.53 |
| 120 | 3/1/2/1.5 | 7.5 | R-3053A | 43.03 | 0.00 | 0.00 | 66.47 | 0.34 | 31.24 |
| 121 | 0/1.5/1.5/2 | 5 | R-3053A | 43.74 | 3.00 | 6.02 | 24.76 | 20.96 | 30.79 |
| 122 | 0/1/1/1.5 | 3.5 | R-3053A | 44.48 | 2.64 | 6.93 | 35.30 | 22.96 | 39.34 |
| 123 | 0/1/1/1.5 | 3.5 | R-3053A | 44.22 | 0.70 | 2.80 | 19.80 | 18.14 | 34.21 |
| 124 | 0/2/2/1.5 | 5.5 | R-3053A | 43.54 | 1.29 | 2.27 | 8.82 | 9.98 | 22.23 |
| 125 | 3/2/1/1.5 | 7.5 | C30+ | 42.68 | 0.88 | 1.93 | 41.18 | 24.38 | 58.31 |
| 126 | 3/2/1/1.5 | 7.5 | R-3053A | 42.93 | 1.85 | 3.70 | 78.72 | 16.11 | 49.05 |
| 127 | 3/2/1/1.5 | 7.5 | C30+ | 42.99 | 0.63 | 0.63 | 79.11 | 4.82 | 43.97 |
| 128 | 0/4/2/1.5 | 7.5 | C30+ | 43.00 | 6.57 | 11.77 | 42.38 | 34.07 | 49.28 |
| 129 | 0/2/1/1.5 | 4.5 | C30+ | 44.08 | 7.19 | 13.77 | 53.82 | 31.50 | 46.60 |
| 130 | 0/2/1/1.5 | 4.5 | R-3053A | 43.76 | 3.01 | 7.95 | 41.00 | 30.51 | 52.81 |
| 131 | 0/2/1/1.5 | 4.5 | C30+ | 44.18 | 5.14 | 11.52 | 61.25 | 20.60 | 40.65 |

TABLE 7-continued

| Ex. | L/PLA/PBS/W* (wt. %) | Coating (wt. %) | Sealant Type | N (wt. %) | Accelerated Nutrient Release Test, % | | | 7-Day (Oven Test), % | |
|---|---|---|---|---|---|---|---|---|---|
| | | | | | 2 hr | 4 hr | 24 hr | 3 Day | 7 Day |
| 132 | 3/2/1/2 | 7 | R-3053A | 43.03 | 1.92 | 5.04 | 51.84 | 43.74 | 71.72 |
| 133 | 0/2/1/2 | 5 | R-3053A | 43.79 | 11.43 | 26.73 | 71.60 | 64.18 | 78.84 |
| 134 | 3/2/1/1.5 | 7.5 | R-3053A | 42.92 | 2.96 | 7.64 | 60.97 | 49.54 | 74.10 |
| 135 | 3/2/1/1.5 | 7.5 | C30+ | 43.41 | 3.35 | 8.95 | 69.52 | 46.01 | 80.98 |
| 136 | 3/2/1/1.5 | 7.5 | R-3053A | 43.32 | 2.64 | 7.25 | 43.78 | 38.32 | 67.08 |
| 137 | 3/2/1/1.5 | 7.5 | C30+ | 43.13 | 3.08 | 8.03 | 61.45 | 54.86 | 85.40 |

*"L" is lignin, "W" is wax

The samples can be segmented into 5 sections based on the 7 day oven test measurements as follows: Examples 100-104 (less than 10% release), Examples 1-5-113 2 (10% to 20% release), Examples 114-124 (20 to 40% release), Examples 125-131 (40 to 60% release), and Examples 132-137 (above 60% release).

Examples 138-150. PLA/PBS Blend

Figure 9:
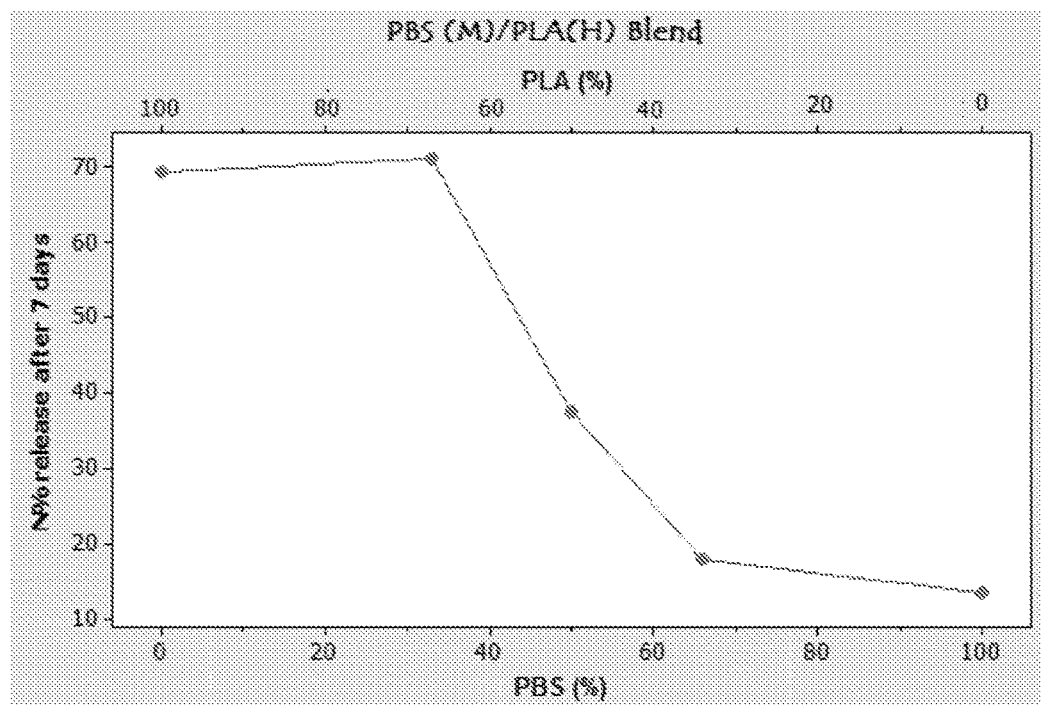
FIG. 9 is a graph showing percent nitrogen release vs. percent PLA and PBS after 7 days at 100° F. (38° C.) of urea granules coated with a first lignin layer, a second layer of PBS (medium), PLA (high), or a blend of PBS (medium) and PLA (high), and a third wax layer.
Figure 10:
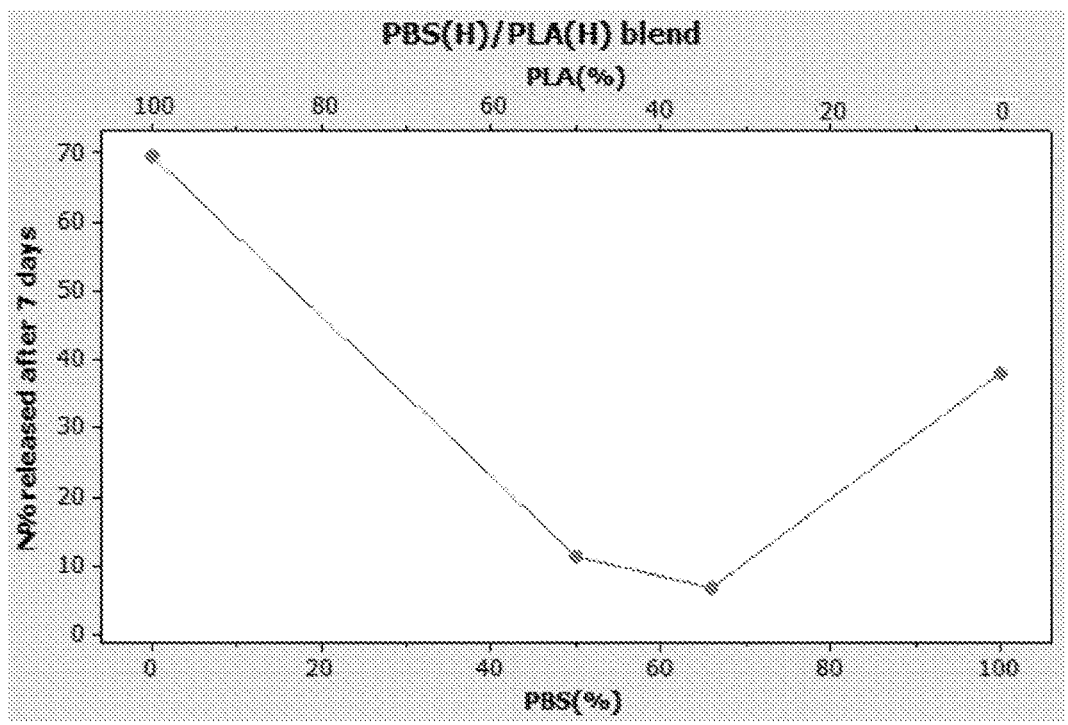
FIG. 10 is a graph showing percent nitrogen release vs. percent PLA (high) and percent PBS (high) after 7 days at 100° F. (38° C.) of urea granules coated with a first lignin layer, a second layer of PBS (high), PLA (high), or a blend of PBS (high) and PLA (high), and a third wax layer.
Figure 11:
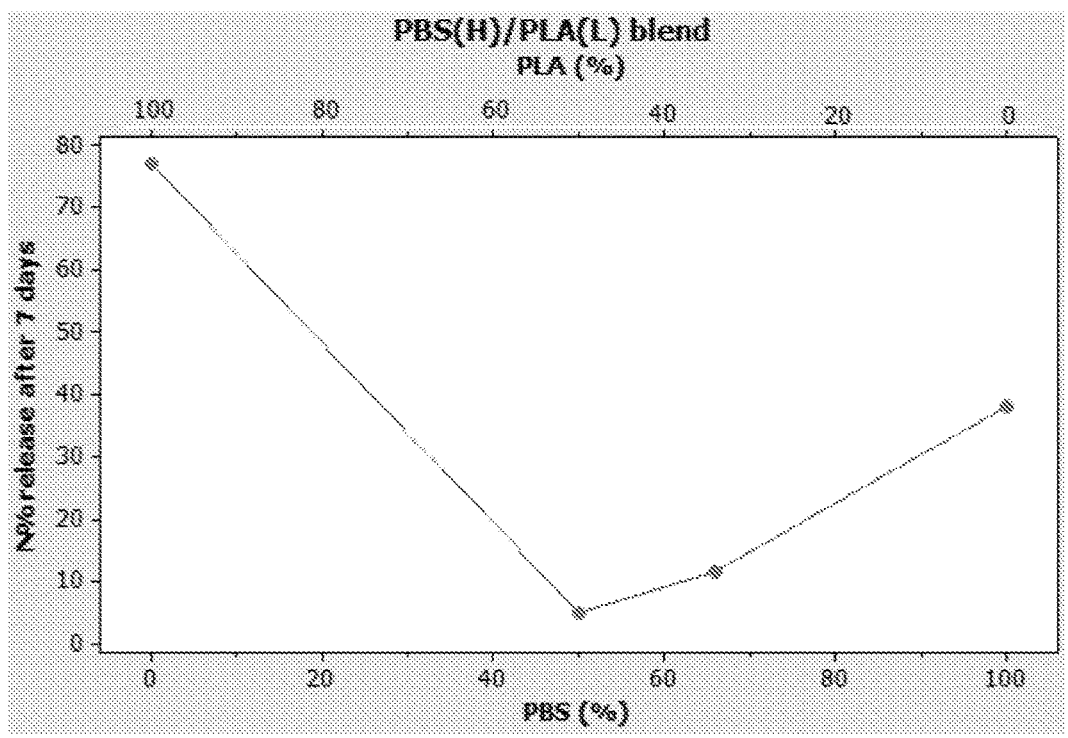
FIG. 11 is a graph showing percent nitrogen release vs. percent PLA and percent PBS after 7 days at 100° F. (38° C.) of urea granules coated with a first lignin layer, a second layer of PBS (high), and PLA (low), or a blend of PBS (high) and PLA (low), and a third wax layer.

Additional PLA/PBS blends were tested. Polymers were coated simultaneously. Formulations and results are shown in Table 8. The 7 day oven test results are also illustrated graphically in FIGS. 9-11.

TABLE 8

| Ex. | L/PLA/PBS/W* (wt. %) | Polymer Type | Coating (wt. %) | Sealant Type | Sealant (wt. %) | N (wt. %) | 14-Day Release test, % (Oven Test) | | |
|---|---|---|---|---|---|---|---|---|---|
| | | | | | | | 3 Day | 7 Day | 14 Day |
| 138 | 3/0/3/1.5 | PBS (medium) | 7.5 | R-3053A | 1.5 | 42.99 | 5.75 | 13.42 | 37.08 |
| 139 | 3/2/1/2 | PLA(high)/PBS(medium) | 8 | R-3053A | 1.5 | 43.03 | 43.74 | 71.72 | 90.06 |
| 140 | 3/1.5/1.5/1.5 | PLA(high)/PBS(medium) | 7.5 | R-3053A | 1.5 | 42.72 | 9.71 | 37.37 | 80.39 |
| 141 | 3/1/2/1.5 | PLA(high)/PBS(medium) | 7.5 | R-3053A | 1.5 | 42.73 | 2.92 | 17.97 | 51.51 |
| 142 | 3/3/0/1.5 | PLA(high) | 6.5 | R-3053A | 1.5 | 43.09 | 54.86 | 69.50 | 87.58 |
| 143 | 3/0/3/1.5 | PBS(high) | 7.5 | R-3053A | 1.5 | 42.86 | 22.09 | 37.98 | 53.23 |
| 144 | 3/1.5/1.5/1.5 | PLA(high)/PBS(high) | 7.5 | R-3053A | 1.5 | 42.74 | 4.36 | 11.26 | 41.91 |
| 145 | 3/1/2/1.5 | PLA(high)/PBS(high) | 7.5 | R-3053A | 1.5 | 42.87 | 2.85 | 6.65 | 45.4 |
| 146 | 3/3/0/1.5 | PLA(high) | 7.5 | R-3053A | 1.5 | 43.09 | 54.86 | 69.50 | 87.58 |
| 147 | 3/0/3/1.5 | PBS(high) | 7.5 | R-3053A | 1.5 | 42.86 | 22.09 | 37.98 | 53.23 |
| 148 | 3/1.5/1.5/1.5 | PLA(low)/PBS(high) | 7.5 | R-3053A | 1.5 | 43.07 | 0.08 | 4.93 | 48.58 |
| 149 | 3/1/2/1.5 | PLA(low)/PBS(high) | 7.5 | R-3053A | 1.5 | 42.77 | 0.00 | 11.63 | 55.62 |
| 150 | 3/3/0/1.5 | PLA(low) | 7.5 | R-3053A | 1.5 | 43.12 | 73.62 | 77.12 | 94.66 |

*"L" refers to lignin and "W" refers to wax.

The data indicate that a combination of PBS (high) and PLA (low) as well as a blend of PBS (high) and PLA (high) have a synergistic effect on the fertilizer nutrient release. For example, at a loading level of 3 wt. %, PBS (high) alone had a 7 day release of 37.98% (example 147) and PLA (low) alone had a 7 day release of 77.12% (example 150). In contrast, when a 1:1 blend of PBS (high) and PLA (low) or a 1:2 blend of PBS (high) and PLA (low) were used at a loading level of 3 wt. %, the 7 day releases were reduced to 4.93% and 11.63% respectively (examples 148 and 149).

Examples 151-155. Lignin with/without Wax

Granular urea was coated with lignin with or without wax. The coating formulations and results are shown in Table 9.

TABLE 9

| Ex. | Lignin (wt. %) | Polymer (wt. %) | Sealant Type | Sealant (wt. %) | Accelerated Nutrient Release Test, % | | | 7-Day (Oven Test), % | |
|---|---|---|---|---|---|---|---|---|---|
| | | | | | 2 hr | 4 hr | 24 hr | 3 Day | 7 Day |
| 151* | 3.0 | 0 | R-3053A | 1.5 | 53.54 | 92.75 | 100 | *** | *** |
| 152* | 3.0 | 0 | C30+ | 1.5 | 82.04 | 98.67 | 98.98 | *** | *** |
| 153* | 2.0 | 0 | C30+ | 0 | 100 | 100 | 100 | *** | *** |
| 154* | 2.0 | 2.0 PBS (high) | C30+ | 1.5 | 0.61 | 1.48 | 56.05 | 35.54 | 81.66 |
| 155* | 2.5 | 3.0 PLA (high) | C30+ | 1.5 | 3.11 | 10.34 | 70.58 | 54.69 | 88.15 |

*Comparative examples

As shown in Table 9, lignin with or without wax showed 92.75% to 98.70% release at 4 hour accelerated nutrient release test. In contrast, when the coating contained PBS or PLA in addition to lignin, the 4 hour accelerated results were 1.48% and 10.34% respectively. The results indicate that lignin at these coating levels by itself does not provide sustainable nutrient release.

Examples 156-175. Comparison Between Sequential and Blend (Simultaneous) Coating In these examples, the total coating was varied between 3.5 to 7.5 wt. %. Lignin (lignin-1) was either kept constant at 3 wt. % (Ex171-175) or was absent from the coating (Ex156-170), PLA was varied between 1 to 2 wt. %, PBS was varied between 1 and 2 wt. %, and the sealant was kept constant at 1.5 wt. %. Granular urea was coated simultaneously or sequentially by spray coating.

Figure 12:
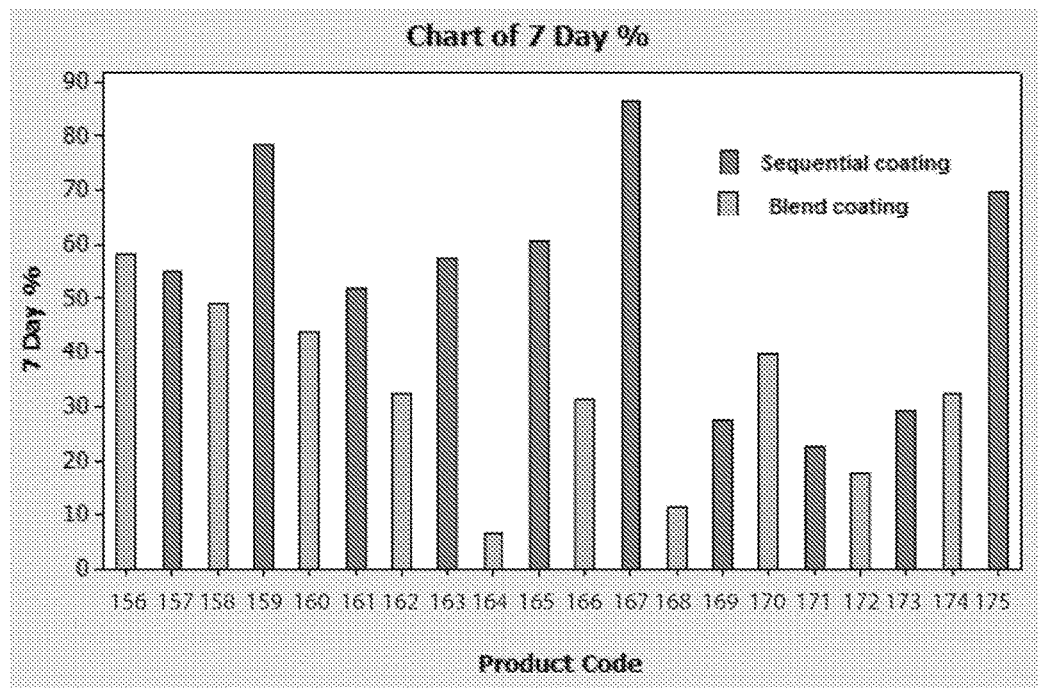
FIG. 12 is a graph showing percent nitrogen release after 7 days at 100° F. (38° C.) of (a) urea granules coated with optionally a first lignin layer, a second PBS layer, a third PLA layer, and a fourth wax layer; and (b) urea granules coated with a first lignin layer, a second PBS and PLA combination layer, and a third wax layer.
Figure 13:
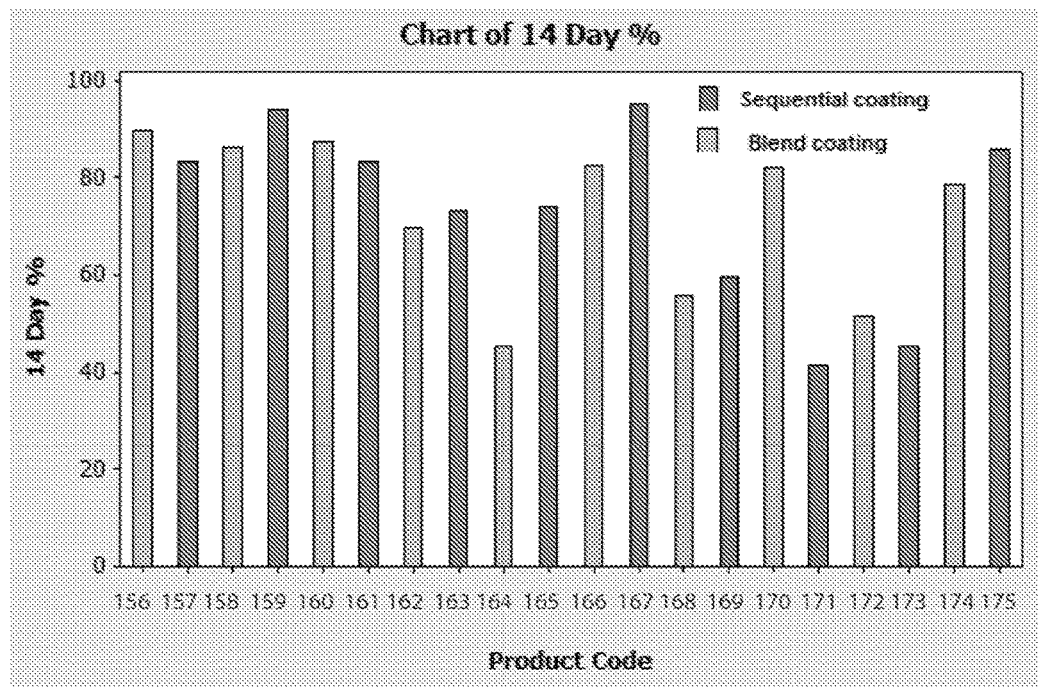
FIG. 13 is a graph of percent nitrogen release after 14 days at 100° F. (38° C.) of (a) urea granules coated with optionally a first lignin layer, a second PBS layer, a third PLA layer, and a fourth wax layer; and (b) urea granules coated with a first lignin layer, a second PBS and PLA combination layer, and a third wax layer.

The coating formulations and the nitrogen release test results are shown in Table 10. The results are also illustrated graphically in FIGS. 12 and 13. The results indicate that blend coated urea performs better than sequentially coated urea for most of the cases based on the 7 day release data. There are no significant differences for the 14 day release data.

TABLE 10

| Ex. | Polymer Type | Polymer (wt. %) | Sealant Type | Coating | N (wt. %) | 14-Day Release test, % (Oven Test) | | |
|---|---|---|---|---|---|---|---|---|
| | | | | | | 3 Day | 7 Day | 14 Day |
| 156 | PLA (high)/PBS (med.) | 2.0/1.0 | C30+ | polymers sprayed simultaneously | 42.68 | 24.38 | 58.31 | 89.81 |
| 157 | PBS (med)/PLA (high) | 1.0/2.0 | C30+ | polymers sprayed sequentially | 43.23 | 27.37 | 55.19 | 83.45 |
| 158 | PLA (low)/PBS (med.) | 2.0/1.0 | R-3053A | polymers sprayed simultaneously | 42.93 | 16.11 | 49.05 | 86.30 |
| 159 | PBS (med.)/PLA (low) | 1.0/2.0 | R-3053A | polymers sprayed sequentially | 43.04 | 54.19 | 78.36 | 94.20 |
| 160 | PLA (low)/PBS (med.) | 2.0/1.0 | C30+ | polymers sprayed simultaneously | 42.99 | 4.82 | 43.97 | 87.41 |
| 161 | PBS (med.)/PLA (low) | 1.0/2.0 | C30+ | polymers sprayed sequentially | 42.96 | 22.19 | 52.11 | 83.14 |
| 162 | PLA (high)/PBS (med.) | 1.0/1.0 | R-3053A | polymers sprayed simultaneously | 43.18 | 14.36 | 32.58 | 69.85 |
| 163 | PLA (high)/PBS (med.) | 1.0/1.0 | R-3053A | polymers sprayed sequentially | 43.39 | 39.83 | 57.41 | 73.25 |
| 164 | PLA (high)/PBS (med.) | 1.0/2.0 | R-3053A | polymers sprayed simultaneously | 42.87 | 2.85 | 6.65 | 45.4 |
| 165 | PLA (high)/PBS (med.) | 2.0/1.0 | R-3053A | polymers sprayed sequentially | 43.14 | 40.09 | 60.73 | 74.14 |
| 166 | PLA (high)/PBS (med.) | 1.0/1.0 | R-3053A | polymers sprayed simultaneously | 43.34 | 4.88 | 31.48 | 82.43 |
| 167 | PLA (high)/PBS (med.) | 1.0/1.0 | R-3053A | polymers sprayed sequentially | 43.35 | 74.49 | 86.58 | 95.24 |
| 168 | PLA (high)/PBS (med.) | 1.0/2.0 | R-3053A | polymers sprayed simultaneously | 42.77 | 0.00 | 11.63 | 55.62 |
| 169 | PLA (high)/PBS (med.) | 2.0/1.0 | R-3053A | polymers sprayed sequentially | 43.30 | 14.53 | 27.60 | 59.54 |
| 170 | PLA (high)/PBS (med.) | 1.0/1.0 | R-3053A | polymers sprayed simultaneously | 43.47 | 10.34 | 39.89 | 82.24 |
| 171 | PLA (high)/PBS (med.) | 1.0/1.0 | R-3053A | polymers sprayed sequentially | 43.82 | 12.63 | 22.53 | 41.27 |
| 172 | PLA (high)/PBS (med.) | 1.0/2.0 | R-3053A | polymers sprayed simultaneously | 42.73 | 2.92 | 17.97 | 51.51 |
| 173 | PLA (high)/PBS (med.) | 2.0/1.0 | R-3053A | polymers sprayed sequentially | 43.53 | 12.75 | 29.15 | 45.44 |

TABLE 10-continued

| Ex. | Polymer Type | Polymer (wt. %) | Sealant Type | Coating | N (wt. %) | 14-Day Release test, % (Oven Test) | | |
|---|---|---|---|---|---|---|---|---|
| | | | | | | 3 Day | 7 Day | 14 Day |
| 174 | PLA (high)/PBS (med.) | 1.0/1.0 | R-3053A | polymers sprayed simultaneously | 43.56 | 8.47 | 32.53 | 78.52 |
| 175 | PLA (high)/PBS (med.) | 1.0/1.0 | R-3053A | polymers sprayed sequentially | 43.82 | 48.48 | 69.89 | 85.84 |

Examples 176-193. Recycled PLA/PBS Blend with or without Lignin

Figure 14:
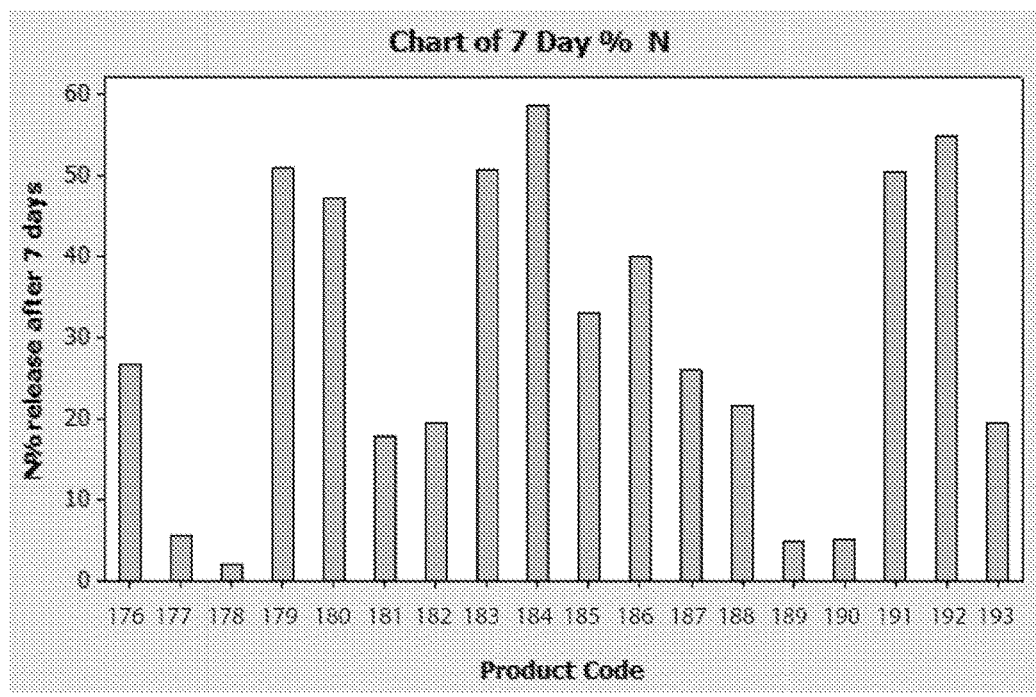
FIG. 14 is a graph showing percent nitrogen release after 7 days at 100° F. (38° C.) of urea granules coated with an optional first lignin layer, a second recycled PLA/PBS combination layer, and a third wax layer.
Figure 15:
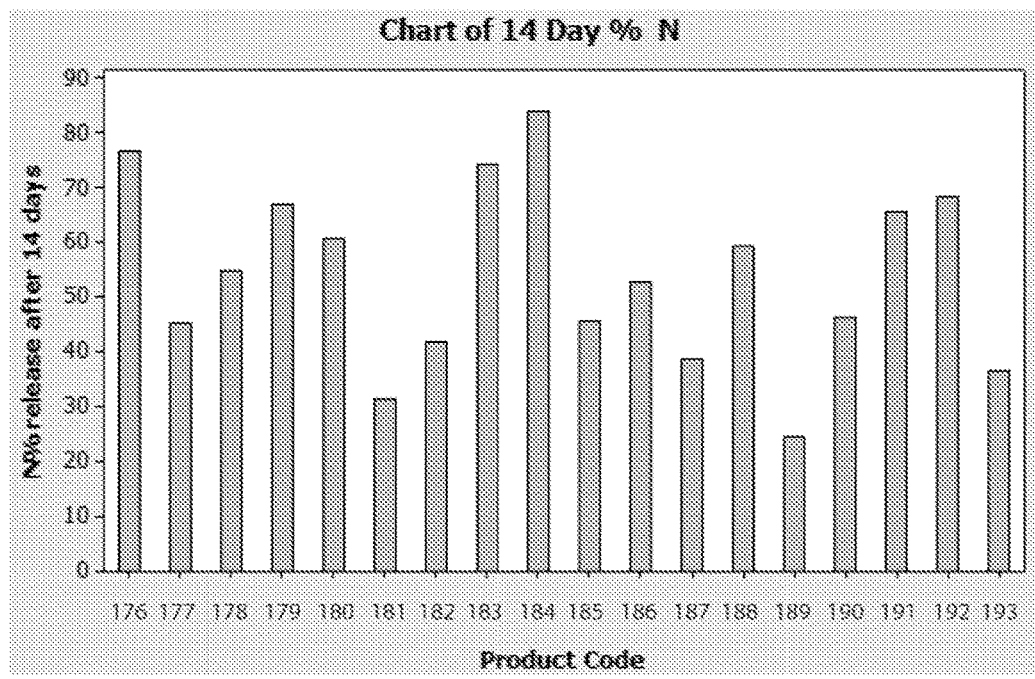
FIG. 15 is a graph showing percent nitrogen release after 14 days at 100° F. (38° C.) of urea granules coated with an optional first lignin layer, a second recycled PLA and PBS combination layer, and a third wax layer.

In these examples, different recycled PLA grades, PLA Repro pkg, PLA Repro-box, PLA Repro-label, PLA 2500HP, and PLA 3100HP from Natureworks were used. Formulation and results are shown in Table 11. The results are also graphically illustrated in FIGS. 14 and 15.

The results indicate that recycled PLA can also be used in the coating for urea. However, the performance was not as advantageous as the systems using virgin PLA (see Table 8).

Examples 194-197 Recycled PLA-CTA

Granular urea was coated with various recycled PLA-CTA coating systems. The coating formulations and the nitrogen release test results are shown in Table 12. The seven

TABLE 11

| | Lignin | | PLA/PBS/W* | Sealant | Accelerated Nutrient Release Test, % | | | 7-Day (Oven Test), % | | |
|---|---|---|---|---|---|---|---|---|---|---|
| Ex. | (wt. %) | Polymer Type | (wt. %) | Type | 2 hr | 4 hr | 24 hr | 3 Day | 7 Day | 14 Day |
| 176 | 3 | PLA (Repro-pkg)/PBS(High) | 1.0/1.0/1.5 | R-3053A | 0.71 | 1.51 | 13.71 | 9.68 | 26.62 | 76.63 |
| 177 | 3 | PLA (Repro-box)/PBS(High) | 1.0/2.0/1.5 | R-3053A | 0.18 | 0.30 | 4.42 | 1.19 | 5.55 | 45.17 |
| 178 | 3 | PLA (Repro-label)/PBS(Med) | 1.0/2.0/1.5 | R-3053A | 0.15 | 0.24 | 2.38 | 1.05 | 2.19 | 55.08 |
| 179 | 0 | PLA (Repro-pkg)/PBS(High) | 1.5/1.5/2 | R-3053A | 3.26 | 6.18 | 28.60 | 35.63 | 50.90 | 67.20 |
| 180 | 0 | PLA (Repro-box)/PBS(High) | 2.0/2.0/1.5 | R-3053A | 3.26 | 6.28 | 33.28 | 31.95 | 47.11 | 60.85 |
| 181 | 0 | PLA (Repro-label)/PBS(Med) | 2.0/2.0/1.5 | R-3053A | 2.33 | 4.52 | 16.99 | 11.57 | 17.77 | 31.51 |
| 182 | 3 | PBS (High)/PLA (2500HP) | 1.0/1.0/1.5 | R-3053A | 0.30 | 0.68 | 17.89 | 10.96 | 19.40 | 41.79 |
| 183 | 3 | PBS (High)/PLA (2500HP) | 1.0/2.0/1.5 | R-3053A | 1.27 | 4.05 | 42.38 | 30.62 | 50.65 | 74.48 |
| 184 | 3 | PBS (Med)/PLA (3100HP) | 1.0/2.0/1.5 | R-3053A | 0.98 | 4.52 | 47.22 | 36.32 | 58.50 | 83.97 |
| 185 | 0 | PBS (High)/PLA (3100HP) | 1.0/1.0/2 | R-3053A | 7.68 | 13.34 | 37.27 | 21.94 | 32.93 | 45.51 |
| 186 | 0 | PBS (High)/PLA (2500HP) | 1.5/1.5/1.5 | R-3053A | 12.24 | 21.03 | 51.88 | 25.51 | 39.88 | 52.88 |
| 187 | 0 | PBS (Med)/PLA (3100HP) | 1.5/1.5/1.5 | R-3053A | 3.65 | 9.06 | 34.06 | 14.10 | 26.07 | 38.82 |
| 188 | 3 | PLA (2500HP)/PBS (High) | 1.0/1.0/1.5 | R-3053A | 0.36 | 1.14 | 17.21 | 9.98 | 21.60 | 59.46 |
| 189 | 3 | PLA (2500HP)/PBS (High) | 1.0/2.0/1.5 | R-3053A | 0.28 | 0.68 | 5.04 | 1.79 | 4.94 | 24.52 |
| 190 | 3 | PLA (3100HP)/PBS (Med) | 1.0/2.0/1.5 | R-3053A | 0.20 | 0.42 | 2.71 | 0.70 | 5.13 | 46.42 |
| 191 | 0 | PLA (3100HP)/PBS (High) | 1.0/1.5/1.5 | R-3053A | 15.64 | 24.35 | 49.07 | 36.86 | 50.41 | 65.81 |
| 192 | 0 | PLA (2500HP)/PBS (High) | 1.5/1.5/1.5 | R-3053A | 18.10 | 30.23 | 62.51 | 38.09 | 54.75 | 68.56 |
| 193 | 0 | PLA (3100HP)/PBS (Med) | 1.5/1.5/1.5 | R-3053A | 1.40 | 4.07 | 22.62 | 9.65 | 19.51 | 36.61 |

Figure 16:
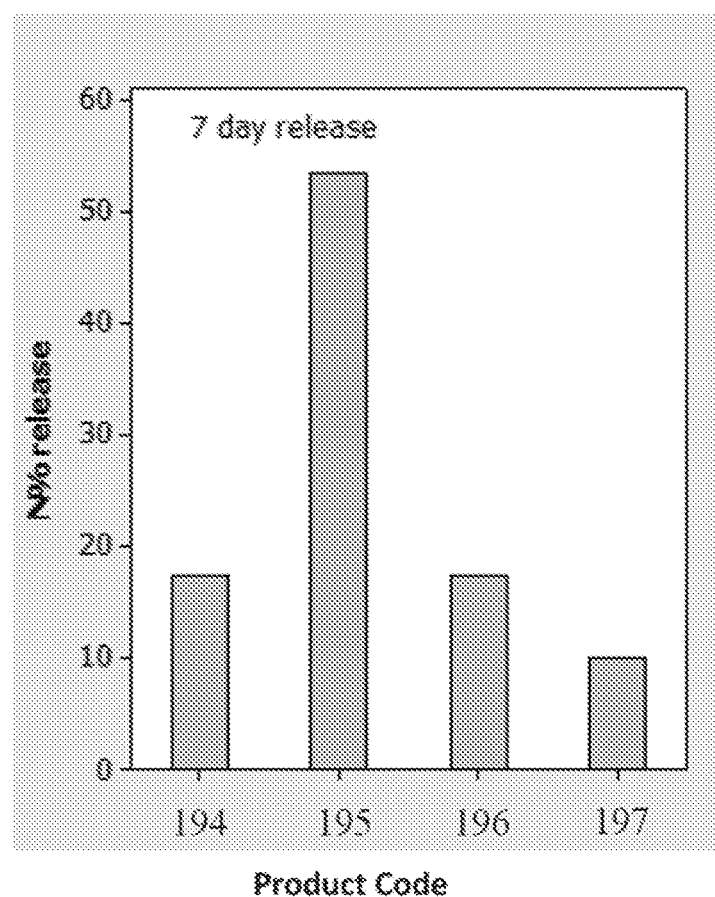
FIG. 16 is a graph showing percent nitrogen release after 7 days at 100° F. (38° C.) of urea granules coated with a first optional lignin layer, a second recycled PLA and cellulose triacetate layer, and a third wax layer.
Figure 17:
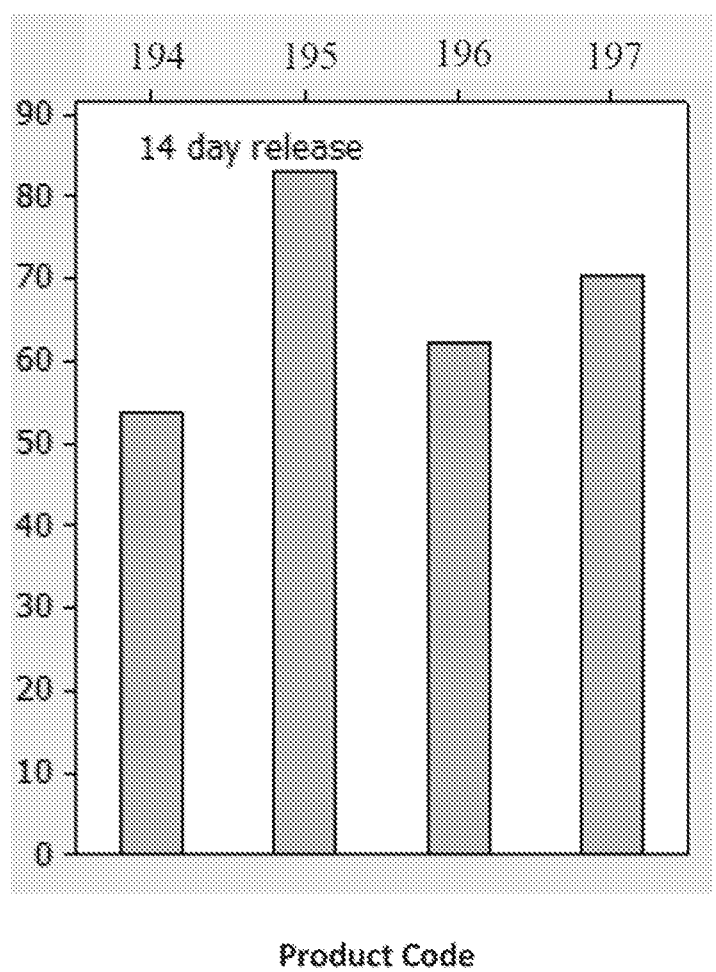
FIG. 17 is a graph showing percent nitrogen release after 14 days at 100° F. (38° C.) of urea granules coated with a first optional lignin layer, a second recycled PLA and cellulose triacetate combination layer, and a third wax layer.

*"W" is wax day and fourteen day release results are also illustrated graphically in FIGS. 16 and 17.

TABLE 12

| Ex. | Lignin (%) | Polymer Type | PLA/PBS/Wax (wt. %) | Sealant Type | Accelerated Nutrient Release Test, % | | | 7-Day (Oven Test), % | | |
|---|---|---|---|---|---|---|---|---|---|---|
| | | | | | 2 hr | 4 hr | 24 hr | 3 Day | 7 Day | 14 Day |
| 194 | 0 | PLA(2500HP)/CTA | 1.5/1.5/1.5 | R-3053A | 1.40 | 2.47 | 14.75 | 4.56 | 17.29 | 53.70 |
| 195 | 0 | PLA(3100HP)/CTA | 1.5/1.5/1.5 | R-3053A | 2.19 | 4.80 | 38.14 | 16.65 | 53.52 | 83.06 |
| 196 | 3 | PLA X(2500HP)/CTA | 1.5/1.5/1.5 | R-3053A | 0.50 | 0.98 | 7.86 | 5.26 | 17.41 | 62.33 |
| 197 | 3 | PLA(3100HP)/CTA | 1.5/1.5/1.5 | R-3053A | 0.45 | 1.10 | 5.03 | 2.21 | 9.91 | 70.41 |

The results indicate that recycled PLA/CTA blends can also be used in the coating for urea. However, at 4.5 wt. % as well as 7.5 wt. % coating levels, PLA/CTA (see Table 3) blends performed superior to recycled PLA/CTA blends in retaining urea based on the 7 day oven test.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A coated fertilizer comprising:
 a fertilizer granule; and
 a coating disposed on a surface of the fertilizer granule, wherein the coating comprises
  a poly(lactic acid);
  a second polymer comprising a poly(butylene succinate); and
  a sealant comprising 0.1 to 2 wt. % wax based on the total weight of the coated fertilizer.

2. The coated fertilizer of claim 1, wherein the nitrogen content of the coated fertilizer is 42 wt % to 45 wt %, based on the total weight of the coated fertilizer.

3. The coated fertilizer of claim 1, wherein the coating comprises the poly(lactic acid), the second polymer, and the sealant in combination in a single layer.

4. The coated fertilizer of claim 1, wherein the coating comprises:
 a first layer disposed on the fertilizer granule, wherein the first layer comprises the poly(lactic acid) and the second polymer; and
 a second layer disposed on the first layer, wherein the second layer comprises the sealant.

5. The coated fertilizer of claim 1, wherein the coating comprises:
 a first layer disposed on the fertilizer granule, wherein the first layer comprises the poly(lactic acid) or the second polymer;
 a second layer disposed on the first layer, wherein the second layer comprises the second polymer or the poly(lactic acid), provided that the first layer is not the same as the second layer; and
 a third layer disposed on the second layer, wherein the third layer comprises the sealant.

6. The coated fertilizer of claim 1, wherein the amount of coating on the fertilizer granule is 0.1 to 6 wt. % based on the total weight of the coated fertilizer and the coating comprises:
 0.1 to 6 wt. % a poly(lactic acid) based on the total weight of the coated fertilizer;
 0.1 to 6 wt. % poly(butylene succinate) based on the total weight of the coated fertilizer; and
 0.1 to 2 wt. % wax based on the total weight of the coated fertilizer.

7. The coated fertilizer of claim 1, wherein the coating comprises a weight ratio of poly(lactic acid) to poly(butylene succinate) of 1:1 to 1:2.

8. The coated fertilizer of claim 7, wherein the poly(butylene succinate) has an average molecular weight of 100,000 to 150,000 g/mol and the poly(lactic acid) has an average molecular weight of 150,000 to 210,000 g/mol or 30,000 to 70,000 g/mol.

9. A method of manufacture of the coated fertilizer of claim 1, the method comprising
 combining the poly(lactic acid), the second polymer, and the sealant to provide a coating composition; and
 depositing the coating composition as a layer on a plurality of fertilizer granules to provide the coated fertilizer.

10. A method of making the coated fertilizer of claim 1, the method comprising:
 dissolving the poly(lactic acid) and the second polymer in a solvent to provide a solution;
 depositing the solution on a fertilizer granule to form a first layer; and
 depositing a sealant on the first layer-coated fertilizer granules to form a second layer.

11. A coated fertilizer comprising:
a fertilizer granule; and
a coating disposed on the fertilizer granule, wherein the coating comprises
hydrophobic lignin, starch acetate, or a combination thereof; and
a second polymer comprising a poly(lactic acid), a poly(butylene succinate), a poly(caprolactone), a poly(butylene terephthalate adipate), a cellulose acetate, or a combination comprising at least one of the foregoing.

12. The coated fertilizer of claim 11, wherein the coating further comprises a sealant.

13. The coated fertilizer of claim 11, wherein the second polymer comprises a combination of poly(lactic acid) and poly(butylene succinate).

14. The coated fertilizer of claim 11, wherein the coating comprises:
a first layer disposed on the fertilizer granule, wherein the first layer comprises the lignin, starch acetate, or a combination thereof;
a second layer disposed on the first layer, wherein the second layer comprises one or more second polymers; and
optionally, a third layer, wherein the third layer comprises an additional second polymer.

15. The coated fertilizer of claim 14, wherein the coating further comprises a sealant layer disposed on the second layer or third layer, wherein the sealant layer comprises a sealant.

16. The coated fertilizer of claim 14, wherein the second layer comprises poly(butylene succinate); and the third layer is present, and comprises poly(lactic acid).

17. A method of making the coated fertilizer of claim 14, the method comprising dissolving the lignin, starch acetate, or a combination thereof in a first solvent to provide a first solution; depositing the first solution on a plurality of fertilizer granules to form a first layer; dissolving the one or more second polymers in a second solvent to provide a polymer solution; depositing the polymer solution on the first layer-coated fertilizer granules to provide a second layer; optionally dissolving an additional second polymer in a third solvent to provide an additional polymer solution; and depositing the additional polymer solution on the second layer-coated fertilizer granules to provide a third layer.

18. The method of claim 17, wherein the second polymer comprises poly(lactic acid), poly(butylene succinate), poly(butylene terephthalate adipate), cellulose acetate, or a combination thereof, and the second solvent comprises dichloromethane.

19. A method of manufacture of the coated fertilizer of claim 14, the method comprising
dissolving the lignin, starch acetate, or a combination thereof in a first solvent to provide a first solution;
depositing the first solution on a plurality of fertilizer granules to form a first layer;
dissolving at least two second polymers in a solvent to provide a second solution; and
depositing the second solution on the first layer-coated fertilizer granules to provide the coated fertilizer.

20. A method of manufacture of the coated fertilizer of claim 14, the method comprising
contacting the lignin, starch acetate, or combination thereof, and a cellulose acetate, poly(caprolactone), or a combination thereof in a solvent to provide a coating composition;
depositing the coating composition on a plurality of fertilizer granules to provide the coated fertilizer.

* * * * *